(12) United States Patent
Kawahara et al.

(10) Patent No.: US 11,124,056 B2
(45) Date of Patent: Sep. 21, 2021

(54) VEHICLE DRIVE APPARATUS

(71) Applicant: EXEDY Corporation, Neyagawa (JP)

(72) Inventors: Yuuki Kawahara, Neyagawa (JP); Kenji Kitada, Neyagawa (JP); Taichi Kitamura, Neyagawa (JP); Kohsuke Murata, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 17/014,114

(22) Filed: Sep. 8, 2020

(65) Prior Publication Data

US 2021/0070161 A1 Mar. 11, 2021

(30) Foreign Application Priority Data

Sep. 9, 2019 (JP) .............................. JP2019-163772
Jan. 20, 2020 (JP) .............................. JP2020-006971

(Continued)

(51) Int. Cl.
*F16H 45/02* (2006.01)
*F16H 41/24* (2006.01)

(Continued)

(52) U.S. Cl.
CPC ............ *B60K 6/383* (2013.01); *F16H 41/24* (2013.01); *F16H 45/02* (2013.01);

(Continued)

(58) Field of Classification Search
CPC . B60K 6/383; B60K 6/40; B60K 6/48; B60K 2006/4825; F16H 41/24;

(Continued)

(56) References Cited

U.S. PATENT DOCUMENTS 6,217,476 B1 * 4/2001 Muller ..................... B60K 6/40
477/5
7,509,802 B2 * 3/2009 Hammond ............... B60K 6/26
60/330

(Continued)

FOREIGN PATENT DOCUMENTS

JP       2005-201402 A      7/2005

*Primary Examiner* — Tinh Dang

(74) *Attorney, Agent, or Firm* — United IP Counselors, LLC

(57) ABSTRACT

A vehicle drive apparatus includes a fluid coupling connected to an engine, and a rotating electric machine connected to the engine via the fluid coupling. The fluid coupling has an impeller to which torque having been output from the engine is input, and a turbine facing the impeller. The impeller rotates about a rotation axis. Torque having been output from the impeller is input to the turbine via a fluid. The turbine rotates about the rotation axis. The vehicle drive apparatus has a path provided between an output shaft of the engine and the impeller, the path through which torque having been output from the engine is transmitted to the impeller not via the turbine, and paths through which torque having been input to the impeller is output via the rotating electric machine, passing through a radially outside relative to the impeller with respect to the rotation axis from the impeller via the turbine.

20 Claims, 33 Drawing Sheets

(30) Foreign Application Priority Data

Feb. 20, 2020 (JP) .............................. JP2020-027174
Sep. 7, 2020 (JP) .............................. JP2020-149682

(51) Int. Cl.
*B60K 6/40* (2007.10)
*B60K 6/48* (2007.10)
*B60K 6/383* (2007.10)

(52) U.S. Cl.
CPC ..... *B60Y 2200/92* (2013.01); *B60Y 2400/424* (2013.01); *B60Y 2400/426* (2013.01); *B60Y 2400/427* (2013.01); *F16H 2045/0221* (2013.01); *F16H 2045/0273* (2013.01)

(58) Field of Classification Search
CPC ............... F16H 45/02; F16H 205/0221; F16H 205/0273; B60Y 2200/92; B60Y 2400/424; B60Y 2400/426; B60Y 2400/427
See application file for complete search history.

(56) References Cited

U.S. PATENT DOCUMENTS

| | | | |
|---|---|---|---|
| 8,839,922 B2* | 9/2014 | Ideshio | B60K 6/40 |
| | | | 192/3.25 |
| 8,955,658 B2* | 2/2015 | Ideshio | B60K 6/48 |
| | | | 192/3.26 |
| 9,097,330 B2* | 8/2015 | Ideshio | F16H 45/02 |
| 2004/0130225 A1* | 7/2004 | Mencher | B60K 6/485 |
| | | | 310/78 |
| 2005/0155831 A1 | 7/2005 | Masuya | |
| 2008/0072586 A1* | 3/2008 | Hammond | B60K 6/405 |
| | | | 60/330 |
| 2013/0277163 A1* | 10/2013 | Ideshio | F16H 41/24 |
| | | | 192/3.28 |
| 2013/0284554 A1* | 10/2013 | Ideshio | B60K 6/40 |
| | | | 192/3.28 |
| 2013/0306423 A1* | 11/2013 | Ideshio | F16H 41/30 |
| | | | 192/3.29 |
| 2020/0039496 A1* | 2/2020 | Lindemann | B60K 6/387 |
| 2020/0040976 A1* | 2/2020 | Steiner | B60K 6/387 |

* cited by examiner

VEHICLE DRIVE APPARATUS

CROSS-REFERENCE TO RELATED APPLICATION

This application claims the benefit of Japanese Patent Application No. 2019-163772, filed Sep. 9, 2019, Japanese Patent Application No. 2020-006971, filed Jan. 20, 2020, Japanese Patent Application No. 2020-027174, filed Feb. 20, 2020, and Japanese Patent Application No. 2020-149682, filed Sep. 7, 2020. The entire contents of those applications are incorporated by reference herein in their entireties.

BACKGROUND OF THE INVENTION

Field of the Invention

The present invention relates to a vehicle drive apparatus arranged between an engine and a transmission.

Description of the Related Art

Patent Document 1 discloses a vehicle drive apparatus. In the vehicle drive apparatus of Patent Document 1, a rotating electric machine and a torque converter are arranged in order from the engine side between an engine and a transmission.

PRIOR ART DOCUMENT

Patent Document

Patent Document 1: JP 2005-201402 A

In the vehicle drive apparatus, the engine and the rotating electric machine are directly coupled with each other. Therefore, in the vehicle drive apparatus, the engine cannot be separated from the rotating electric machine at the time of energy regeneration by the rotating electric machine performed during vehicle deceleration for example, and hence the energy regeneration efficiency by the rotating electric machine may deteriorate due to friction loss or the like of the engine.

SUMMARY OF THE INVENTION

Therefore, an object of the present invention is to solve the above issue and to provide a vehicle drive apparatus capable of improving energy regeneration efficiency by a rotating electric machine during vehicle deceleration.

In accomplishing these and other aspects, according to an aspect of the present invention, there is provided a vehicle drive apparatus, comprising:

a fluid coupling connected to an engine; and a rotating electric machine connected to the engine via the fluid coupling, wherein the fluid coupling has an impeller to which torque having been output from the engine is input, the impeller rotating about a rotation axis of an output shaft of the engine, and a turbine facing the impeller, the turbine to which torque having been output from the impeller is input via a fluid, the turbine rotating about the rotation axis, and the vehicle drive apparatus has a path provided between the output shaft of the engine and the impeller, the path through which torque having been output from the engine is transmitted to the impeller not via the turbine, and a path through which torque having been input to the impeller is output via the rotating electric machine, passing through a radially outside relative to the impeller with respect to the rotation axis from the impeller via the turbine.

According to the above-described aspect of the present invention, the engine and the rotating electric machine are connected via the fluid coupling. With such configuration, at the time of energy regeneration by the rotating electric machine performed during vehicle deceleration for example, it is possible to reduce the influence of friction loss or the like of the engine, and to improve the energy regeneration efficiency by the rotating electric machine.

DESCRIPTION OF EMBODIMENTS

Hereinafter, embodiments according to the present invention will be described in detail with reference to the drawings.

First Embodiment

Figure 1A:
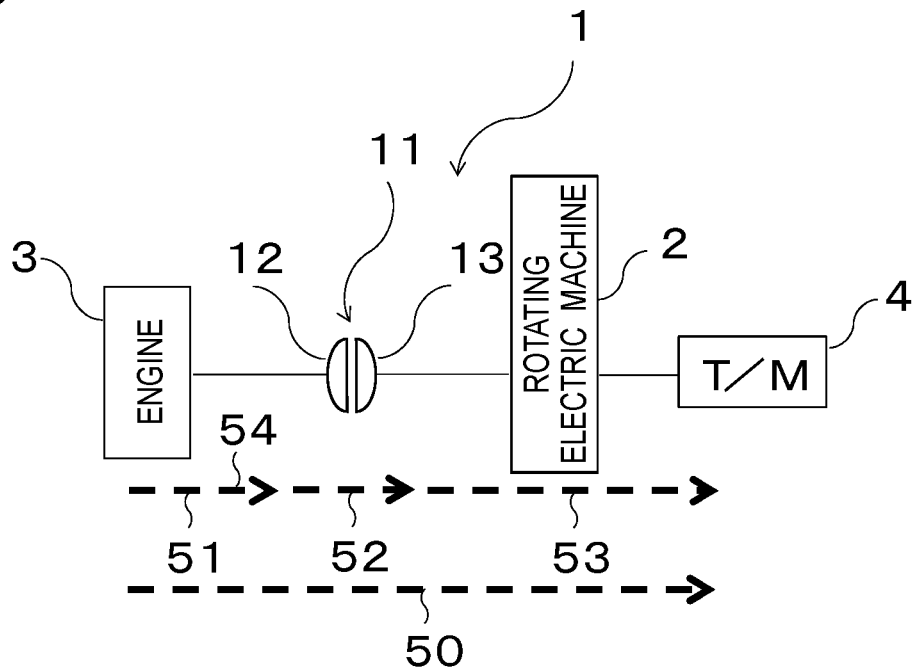
FIG. 1A is a schematic input path diagram of a vehicle drive apparatus according to a first embodiment of the present invention.

A vehicle drive apparatus 1 of the first embodiment of the present invention includes a fluid coupling 11 arranged between an engine 3 and a transmission 4, and a rotating electric machine 2 arranged between the fluid coupling 11 and the transmission 4 as illustrated in FIG. 1A.

Figure 1B:
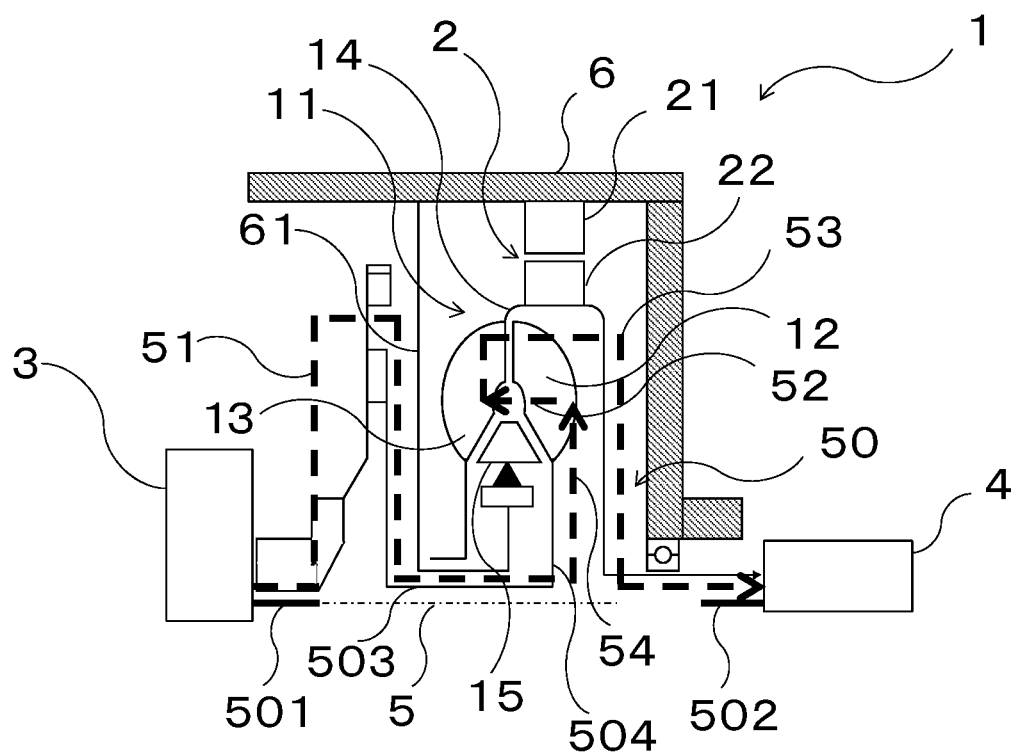
FIG. 1B is a schematic configuration diagram of the vehicle drive apparatus illustrated in FIG. 1A.

As illustrated in FIG. 1B, the vehicle drive apparatus 1 further includes a virtual rotation axis 5 coaxial with an output shaft 501 of the engine 3 and an input shaft 502 of the transmission 4, and a power transmission path 50 between the engine 3 and the transmission 4, and can be applied to a hybrid electric vehicle (HEV) as an example. The fluid coupling 11 and the rotating electric machine 2 are arranged in order from the rotation axis 5 outwards in the radial direction with respect to the rotation axis 5 (hereinafter referred to simply as the radial direction). In other words, the rotating electric machine 2 is arranged outside relative to the fluid coupling 11 in the radial direction.

The power transmission path 50 includes a first path 51, a second path 52, a third path 53, and a fourth path 54. The first path 51 is a path for transmitting torque having been output from the engine 3 to an impeller 12 of the fluid coupling 11 to be described later. The second path 52 is a path for transmitting, via a fluid, the torque having been output from the impeller 12 to a turbine 13 of the fluid coupling 11 to be described later. The third path 53 is a path for transmitting the torque having been output from the turbine 13 to the transmission 4 via the outer shell of the fluid coupling 11 to be described later. The fourth path 54 is formed on a radial connection member 504 and constitutes a part of the first path 51.

The output shaft 501 of the engine 3 and the input shaft 502 of the transmission 4 may not be coaxial.

The rotating electric machine 2 has a stator 21 and a rotor 22. The stator 21 is fixed to a fixed portion 6 which is a non-rotation member such as a housing of the vehicle drive apparatus 1. The rotor 22 is arranged on the power transmission path 50, facing the stator 21, inside relative to the stator 21 in the radial direction. The rotor 22 is connected to an outer shell 14 of the fluid coupling 11 to be described later, and is configured to be rotatable about the rotation axis 5 with respect to the fixed portion 6, integrally with the outer shell 14. The rotation center axis of the rotating electric machine 2 may not be coaxial with the output shaft 501 of the engine 3 or the input shaft 502 of the transmission 4.

The fluid coupling 11 has at least the impeller 12, the turbine 13, the outer shell 14, and a stator 15. The impeller 12 is configured to receive the torque having been output from the engine 3 having been transmitted via the first path 51 and to be rotatable about the rotation axis 5. The turbine 13 is configured to face the impeller 12, to be arranged closer to the engine 3 relative to the impeller 12 in the direction in which the rotation axis 5 extends, to receive, via a fluid such as oil, the torque having been output from the impeller 12, and to be rotatable about the rotation axis 5. The outer shell 14 is cylindrically arranged outside the turbine 13 in the radial direction, is connected to the turbine 13 and the input shaft 502 of the transmission 4, and is configured to be rotatable about the rotation axis 5 with respect to the fixed portion 6. The stator 15 is arranged between the impeller 12 and the turbine 13 and in the vicinity of the rotation axis 5 in the radial direction, and is connected to the fixed portion 6 via a fixing member 61. The stator 15 may not be connected to the fixed portion 6 via the fixing member 61, and may be connected to a one-way clutch incorporated in the stator 15, for example.

The first path 51 is a torque transmission path formed in a first path forming portion composed of the output shaft 501 of the engine 3, a transmission member 503, and the radial connection member 504 connected to the impeller 12. The transmission member 503 is a rotation member connected to the output shaft 501 and the radial connection member 504, and the end portion thereof closer to the radial connection member 504 (in other words, the impeller 12) is arranged in a region closer to the rotation axis 5 relative to the impeller 12 in the radial direction. The radial connection member 504 extends outwards in the radial direction from a region closer to the rotation axis 5 relative to the impeller 12, and is connected to the impeller 12. In other words, in the vehicle drive apparatus 1, the torque having been output from the engine 3 is transmitted in the direction in which the rotation axis 5 extends via the transmission member 503, and is transmitted to the impeller 12 outwardly from the inside in the radial direction via a fourth path 54 formed in the radial connection member 504. The radial connection member 504 may be formed integrally with the transmission member 503 or may be formed separately. The second path 52 is a torque transmission path from the impeller 12 to the turbine 13 via a fluid, and the torque having been output from the impeller 12 is transmitted to the turbine 13 via the fluid of the fluid coupling 11. The third path 53 is a torque transmission path from the turbine 13 to the input shaft 502 of the transmission 4 via the outer shell 14 and the rotor 22 of the rotating electric machine 2, and the torque having been output from the turbine 13 is transmitted to the input shaft 502 of the transmission 4 via the outer shell 14 and the rotor 22 of the rotating electric machine 2.

A torque transmission operation and an energy regeneration operation of the vehicle drive apparatus 1 of the first embodiment will be described.

The torque from the engine 3 to the transmission 4 at the time of starting the engine drive is transmitted as follows.

The torque having been output from the engine 3 by engine drive or the like is transmitted to the impeller 12 via the first path 51, specifically, via the output shaft 501 of the engine 3, the transmission member 503, and the radial connection member 504 in this order. The torque transmitted to the impeller 12 is transmitted to the turbine 13 via the second path 52, specifically, via the fluid between the impeller 12 and the turbine 13. The torque transmitted to the turbine 13 is input to the transmission 4 via the third path 53, specifically, via the outer shell 14 of the fluid coupling 11, the rotor 22 of the rotating electric machine 2, and the input shaft 502 of the transmission 4.

On the other hand, the torque from the transmission 4 towards the engine 3 at the time of energy regeneration or the like is transmitted as follows.

The torque having been output from the transmission 4 due to vehicle deceleration or the like is transmitted to the turbine 13 via the third path 53, specifically, via the input shaft 502 of the transmission 4, the outer shell 14 of the fluid coupling 11, and the rotor 22 of the rotating electric machine 2. At this time, the torque transmitted to the rotor 22 of the rotating electric machine 2 is used for energy regeneration.

The torque transmitted to the turbine 13 is substantially not transmitted to the impeller 12. This is because the fluid coupling 11 has the characteristic of transmitting power only in one direction from the impeller 12 to the turbine 13 substantially. Therefore, in the vehicle drive apparatus 1, the engine 3 is substantially separated from the rotating electric machine 2 at the time of energy regeneration.

In short, according to the vehicle drive apparatus 1, the torque transmission path of the fluid coupling 11 is configured so that torque is output from the outer shell 14 via the impeller 12 and the turbine 13 from the engine side. Therefore, the rotating electric machine 2 can be connected to the transmission side only by connecting the rotating electric machine 2 such as a motor to the outer shell 14 of the fluid coupling 11. With such configuration, at the time of energy regeneration by the rotating electric machine 2 performed during vehicle deceleration for example, it is possible to separate the engine 3 from the rotating electric machine 2 by the fluid coupling 11, and to reduce the influence of friction loss or the like of the engine. As a result, it is possible to improve the energy regeneration efficiency by the rotating electric machine 2. On the other hand, in the case where a motor is connected to the fluid coupling as described in the prior art, the motor is connected to the engine side, which causes engine friction at the time of energy regeneration, for example.

Second Embodiment

Figure 2A:
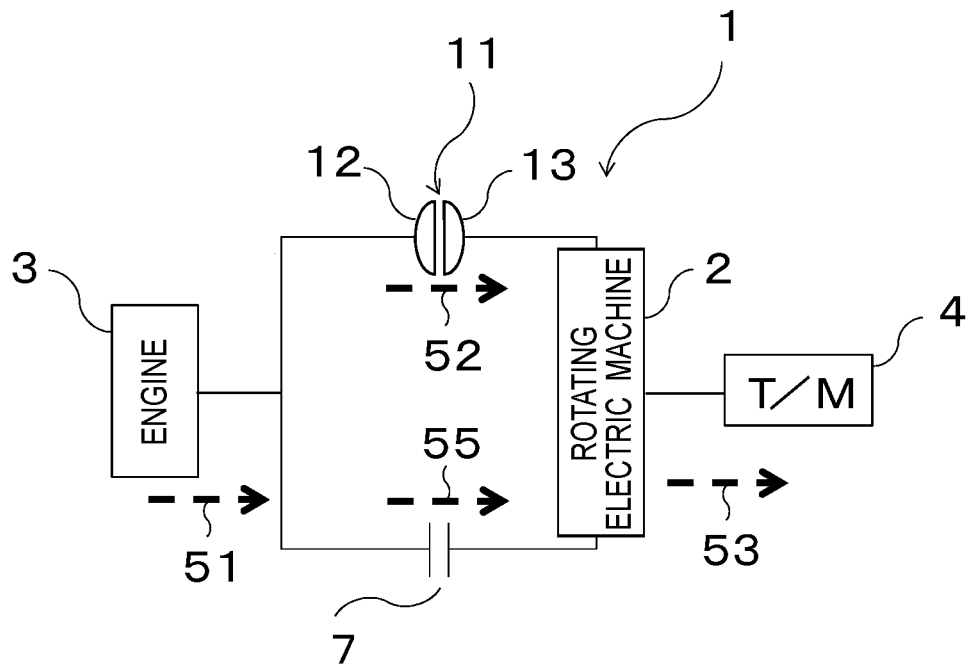
FIG. 2A is a schematic input path diagram of a vehicle drive apparatus according to a second embodiment of the present invention.

The vehicle drive apparatus 1 of the second embodiment of the present invention is different from that of the first embodiment in terms of including a clutch element 7 as illustrated in FIG. 2A. In the second embodiment, identical parts as those in the first embodiment are given the identical reference numerals and the description thereof is omitted, and differences from the first embodiment are described.

The clutch element 7 is arranged in parallel with the fluid coupling 11 between the engine 3 and the rotating electric machine 2, and forms a fifth path 55 between the middle of the first path 51 and the rotating electric machine 2. The fifth path 55 constitutes a part of the power transmission path 50.

Figure 2B:
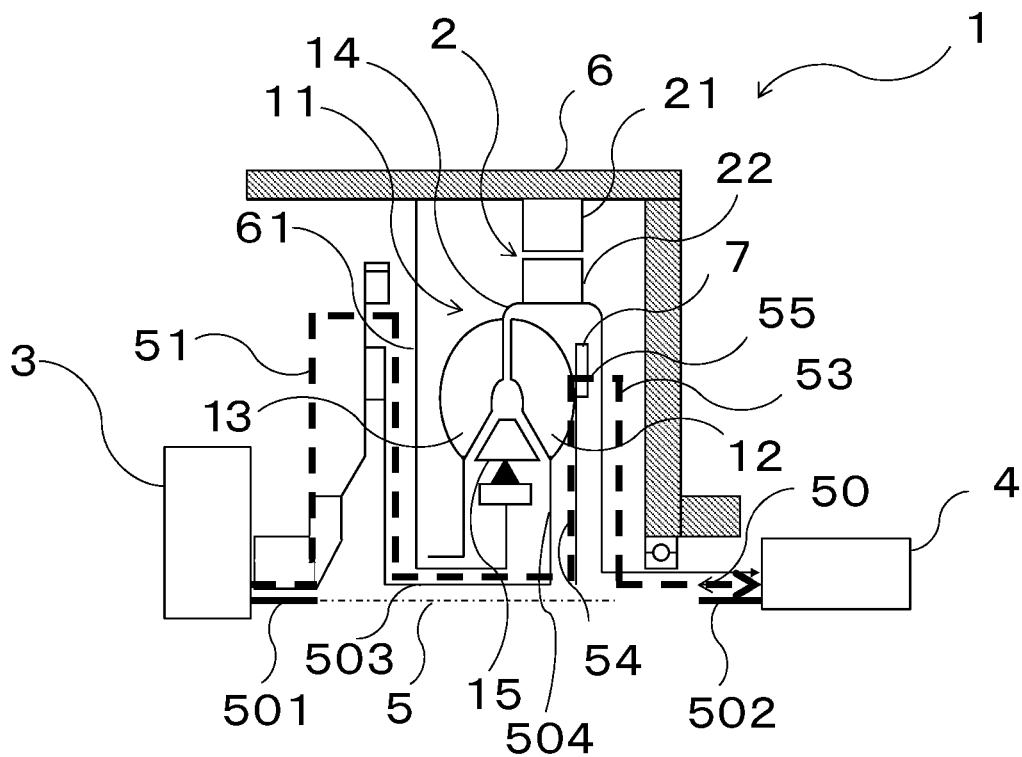
FIG. 2B is a schematic configuration diagram of the vehicle drive apparatus of FIG. 2A.

As illustrated in FIG. 2B, the clutch element 7 is arranged so that the impeller 12 and the outer shell 14 can be fastened with each other. By fastening the impeller 12 and the outer shell 14 with each other by the clutch element 7, the torque having been output from the engine 3 is input to the transmission 4 via the fifth path 55 and not via the turbine 13.

The clutch element 7 is fastened or released depending on an operation mode when the engine is driven, and released at the time of energy regeneration. The clutch element 7 may be either normally closed or normally open.

The fluid coupling 11 may deteriorate torque transmission efficiency due to slippage that may occur between the impeller 12 and the turbine 13.

According to the vehicle drive apparatus 1 of the second embodiment, the clutch element 7 arranged in parallel with the fluid coupling 11 is provided between the engine 3 and the rotating electric machine 2. With such configuration, it is possible to prevent the torque transmission efficiency from deteriorating due to slippage occurred in the fluid coupling 11, and to improve the fuel economy of the vehicle.

(Variations)

The vehicle drive apparatus can further include a damper mechanism 8, as illustrated in FIGS. 3A to 9B. The damper mechanism 8 is composed of a spring member that damps vibration, for example. The damper mechanism 8 may be arranged between the engine 3 and the fluid coupling 11 as illustrated in FIGS. 3A to 4B and FIGS. 7A and 7B, may be arranged between the clutch element 7 and the rotating electric machine 2 as illustrated in FIGS. 5A and 5B and FIGS. 8A and 8B, or may be arranged between the engine 3 and the clutch element 7 as illustrated in FIGS. 6A and 6B and FIGS. 9A and 9B.

Figure 3A:
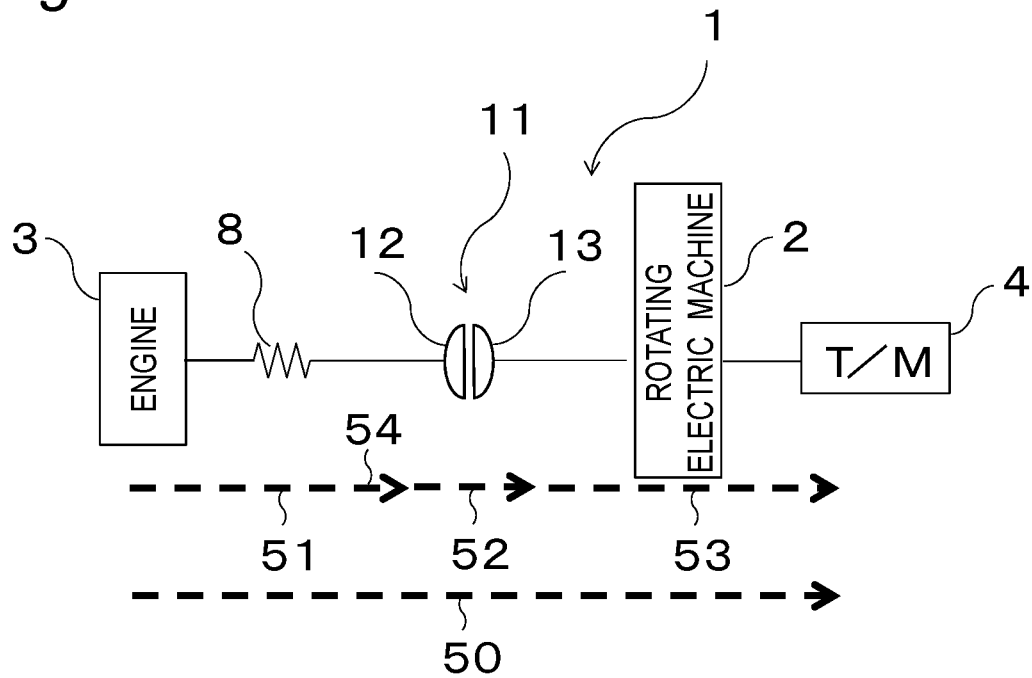
FIG. 3A is a schematic input path diagram of a vehicle drive apparatus of a variation of the first embodiment illustrated in FIG. 1A.
Figure 3B:
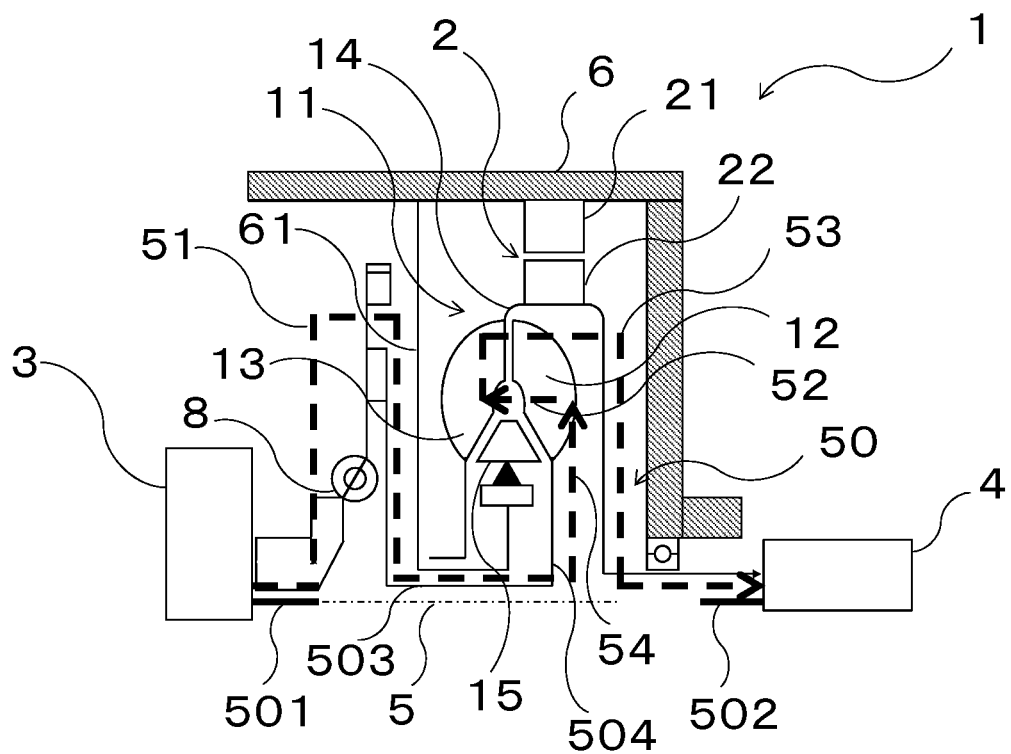
FIG. 3B is a schematic configuration diagram of the vehicle drive apparatus of the variation of the first embodiment illustrated in FIG. 3A.

First, as a variation of the first embodiment, as illustrated in FIGS. 3A and 3B, the damper mechanism 8 may be arranged on the first path 51 between the engine 3 and the fluid coupling 11. With this, vibration generated in the engine 3 can be damped, and this vibration can be prevented from being transmitted to the rotating electric machine 2 and the transmission 4 via the second path 52 and the third path 53.

Figure 4A:
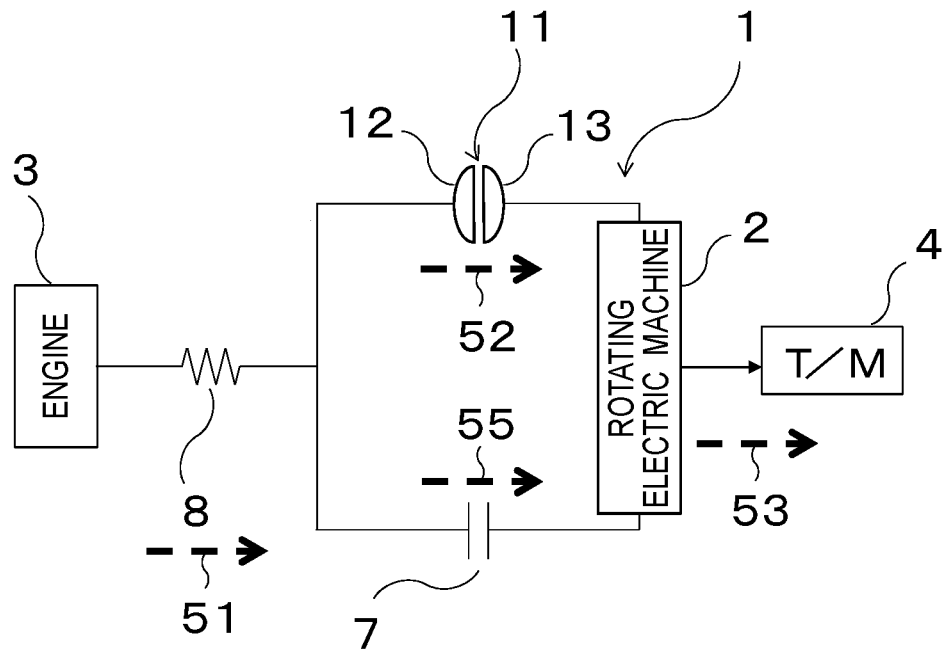
FIG. 4A is a schematic input path diagram of a vehicle drive apparatus of a first variation of the second embodiment illustrated in FIG. 2A.
Figure 4B:
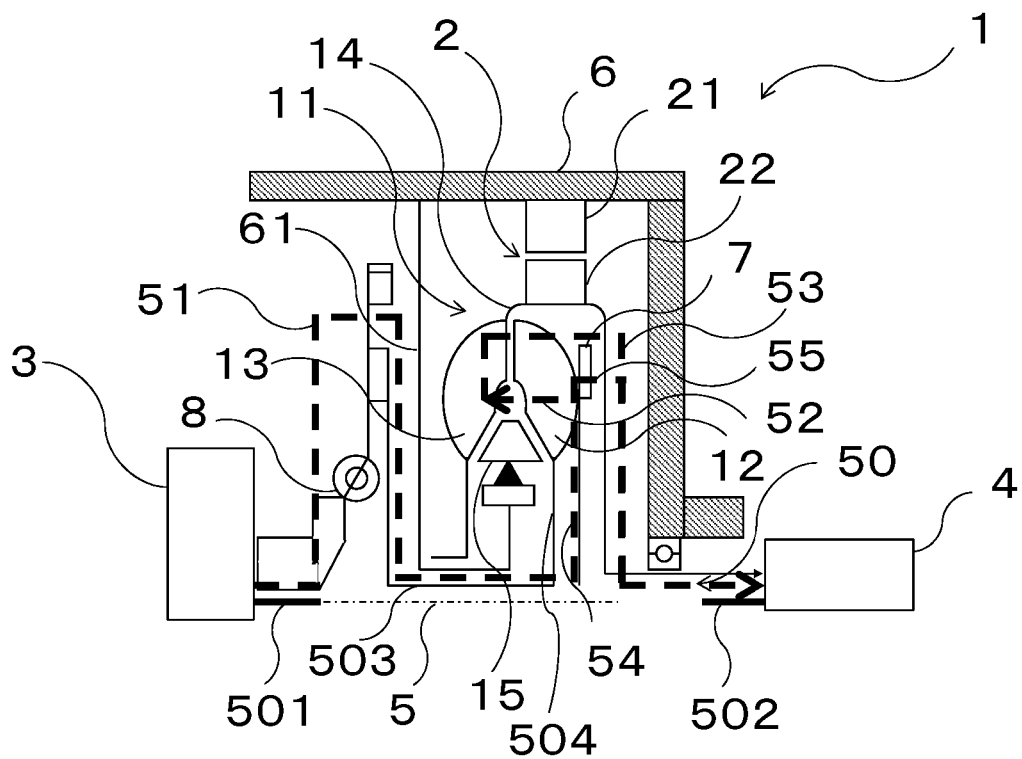
FIG. 4B is a schematic configuration diagram of the vehicle drive apparatus of the first variation of the second embodiment illustrated in FIG. 4A.

As the first variation of the second embodiment, as illustrated in FIGS. 4A and 4B, the damper mechanism 8 may be arranged on the first path 51 between the engine 3, and the fluid coupling 11 and the clutch element 7. With this, vibration generated in the engine 3 can be damped, and this vibration can be prevented from being transmitted to the rotating electric machine 2 and the transmission 4 via the second path 52 and the third path 53 or via the fifth path 55 and the third path 53.

As the second to the sixth variations of the second embodiment, as illustrated in FIGS. 5A to 9B, the damper mechanism 8 may be arranged in series with the clutch element 7 on a transmission path between the engine 3 and the third path 53, for example, the rotating electric machine 2.

Figure 5A:
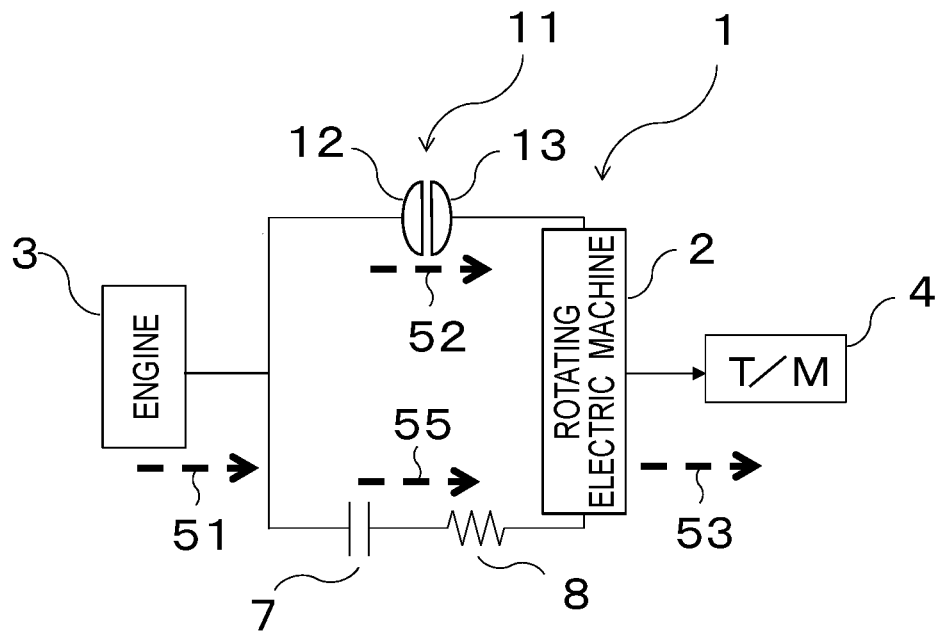
FIG. 5A is a schematic input path diagram of a vehicle drive apparatus of a second variation of the second embodiment illustrated in FIG. 2A.
Figure 5B:
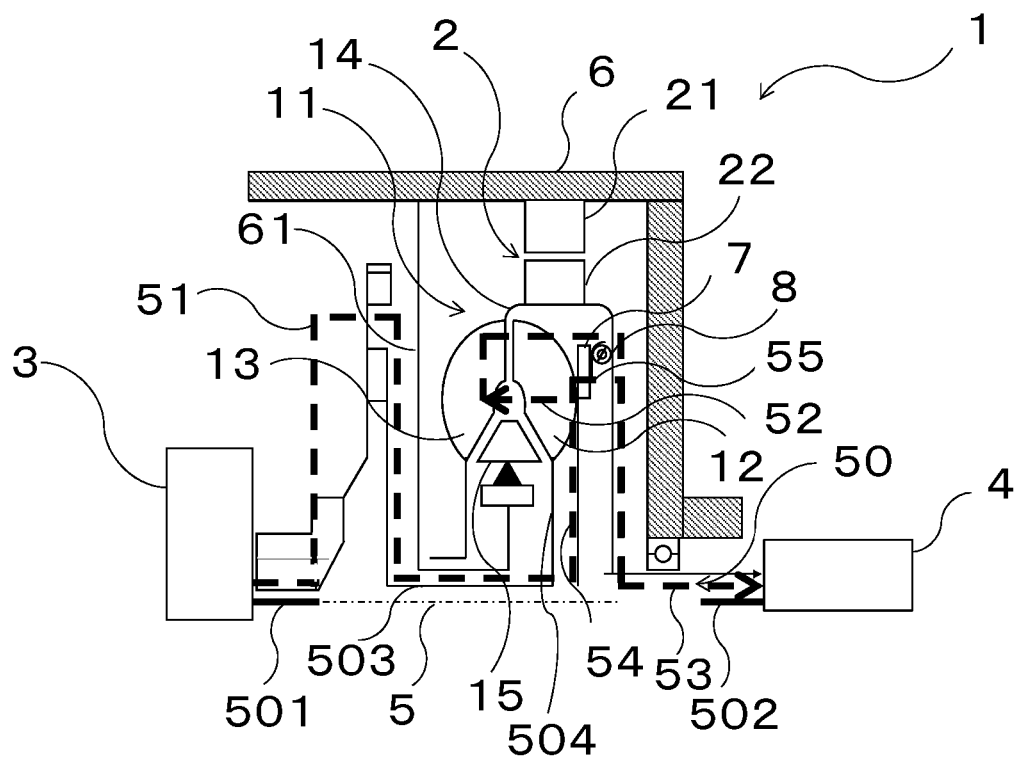
FIG. 5B is a schematic configuration diagram of the vehicle drive apparatus of the second variation of the second embodiment illustrated in FIG. 5A.
Figure 6A:
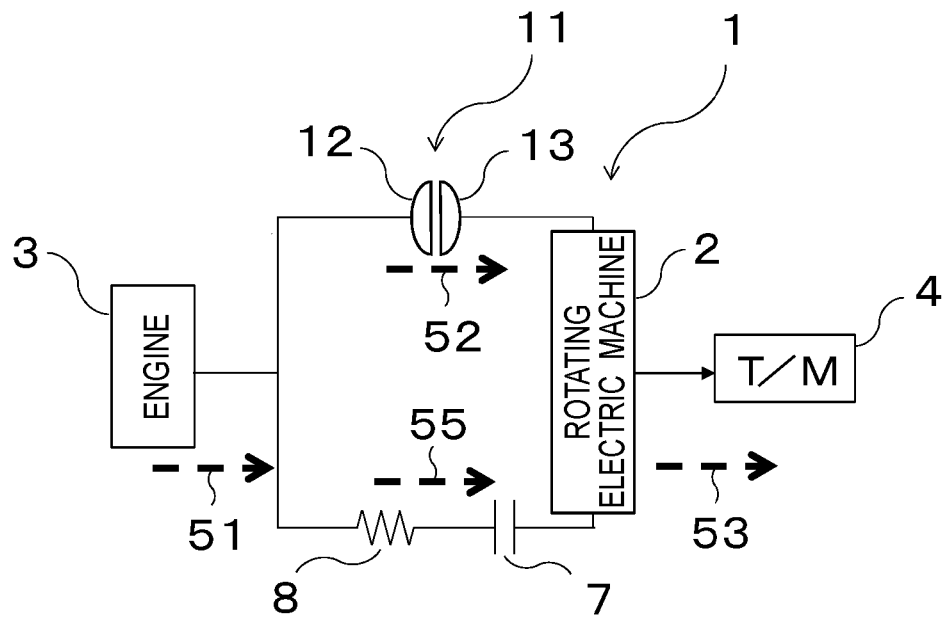
FIG. 6A is a schematic input path diagram of a vehicle drive apparatus of a third variation of the second embodiment illustrated in FIG. 2A.
Figure 6B:
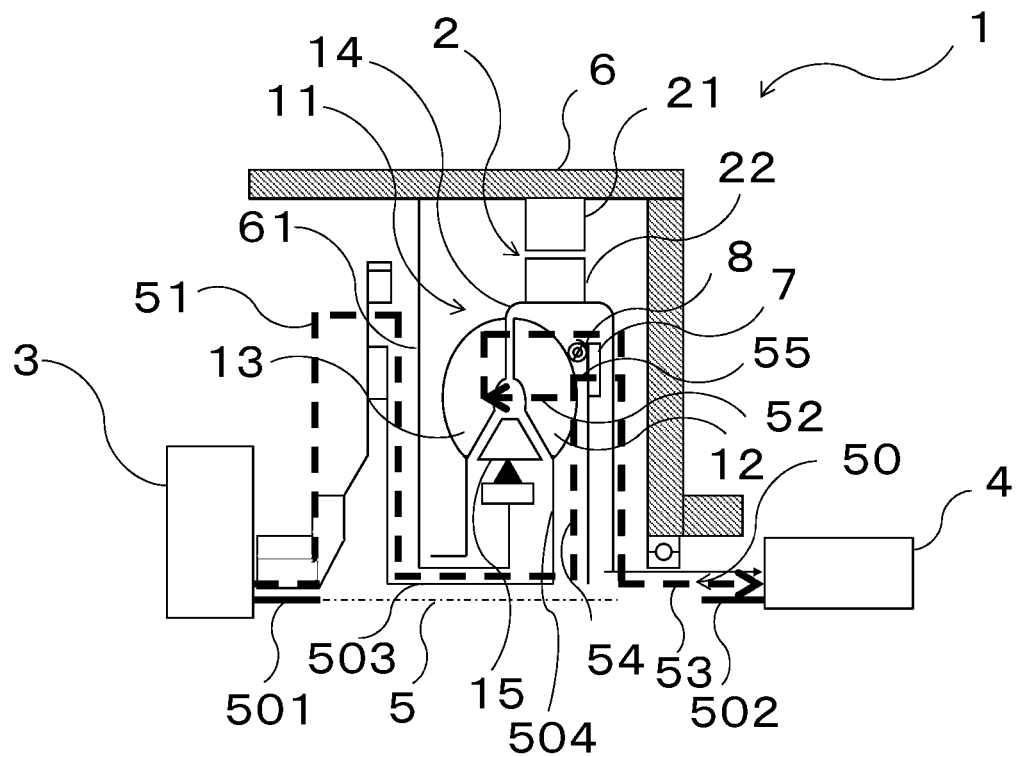
FIG. 6B is a schematic configuration diagram of the vehicle drive apparatus of the third variation of the second embodiment illustrated in FIG. 6A.

In FIGS. 5A and 5B, as the second variation, the damper mechanism 8 is arranged between the clutch element 7 and the third path 53, for example, the rotating electric machine 2. In FIGS. 6A and 6B, as the third variation, the damper mechanism 8 is arranged between the engine 3 and the clutch element 7. With such configuration, vibration generated in the engine 3 can be damped, and the vibration can be prevented from being transmitted to the rotating electric machine 2 and the transmission 4 via the fifth path 55 and the third path 53.

Figure 7A:
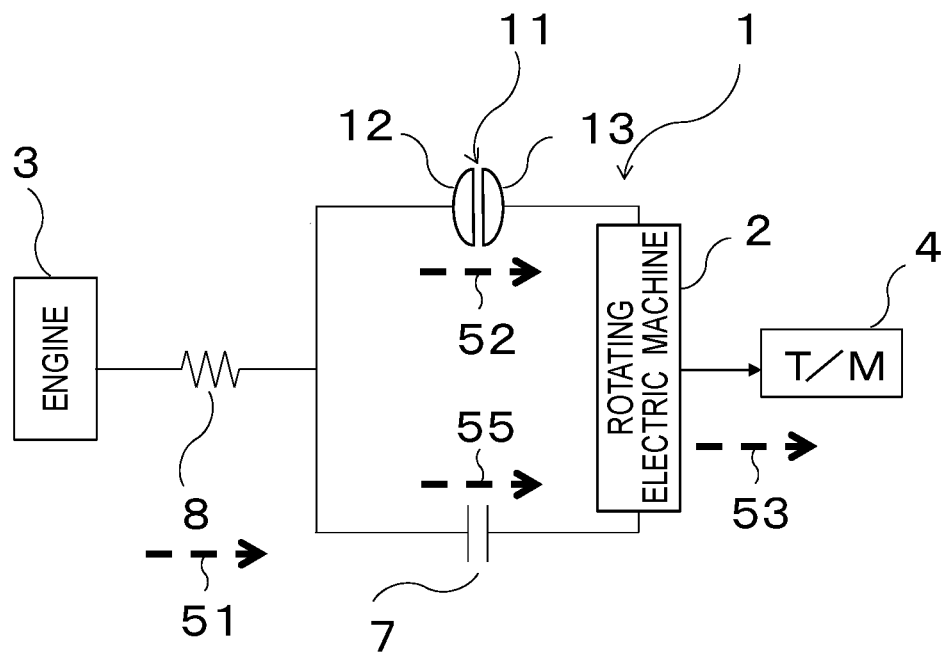
FIG. 7A is a schematic input path diagram of a vehicle drive apparatus of a fourth variation of the second embodiment illustrated in FIG. 2A.
Figure 7B:
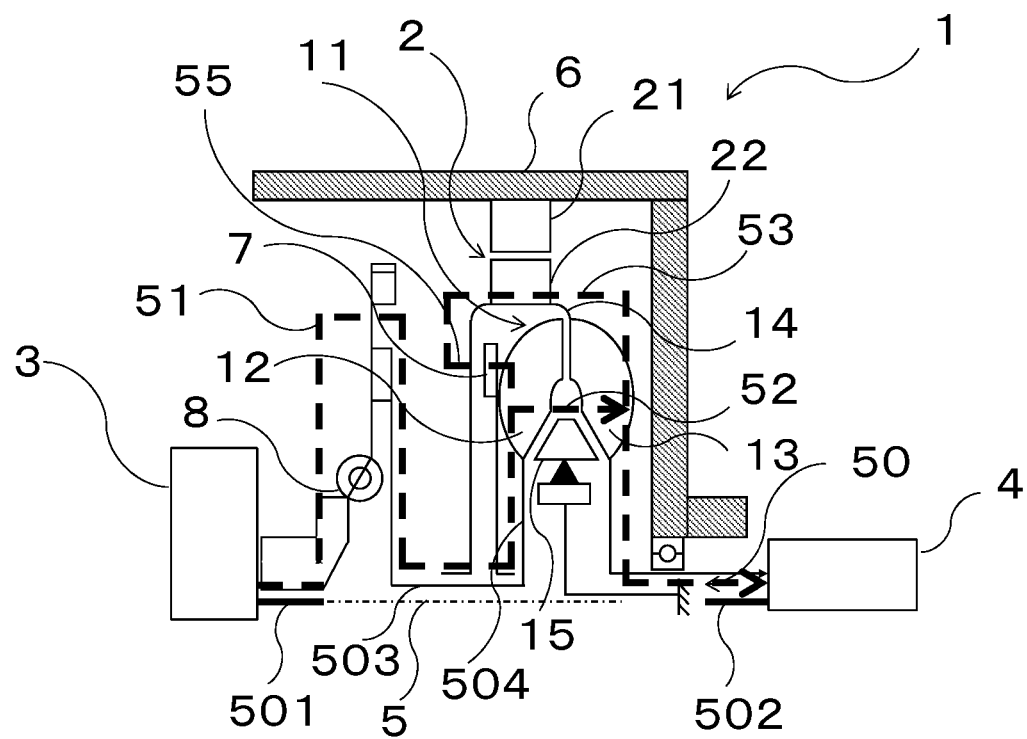
FIG. 7B is a schematic configuration diagram of the vehicle drive apparatus of the fourth variation of the second embodiment illustrated in FIG. 7A.

In FIGS. 7A and 7B, as the fourth variation of the second embodiment, the impeller 12 and the turbine 13 are alternately arranged while facing each other as compared with the first variation. In other words, the impeller 12 and the turbine 13 are arranged in this order from the engine 3 side towards the transmission 4 in the axial direction of the rotation axis 5. Also in FIGS. 8A to 9B to be described later, they are arranged in the same order. As illustrated in FIGS. 7A and 7B, the damper mechanism 8 may be arranged on the first path 51 between the engine 3, and the fluid coupling 11 and the clutch element 7. In FIGS. 7A to 9B, as compared with the corresponding first to third variations, respectively, the first path 51 remains composed of the output shaft 501 of the engine 3, the transmission member 503, and the radial connection member 504 connected to the impeller 12.

Figure 8A:
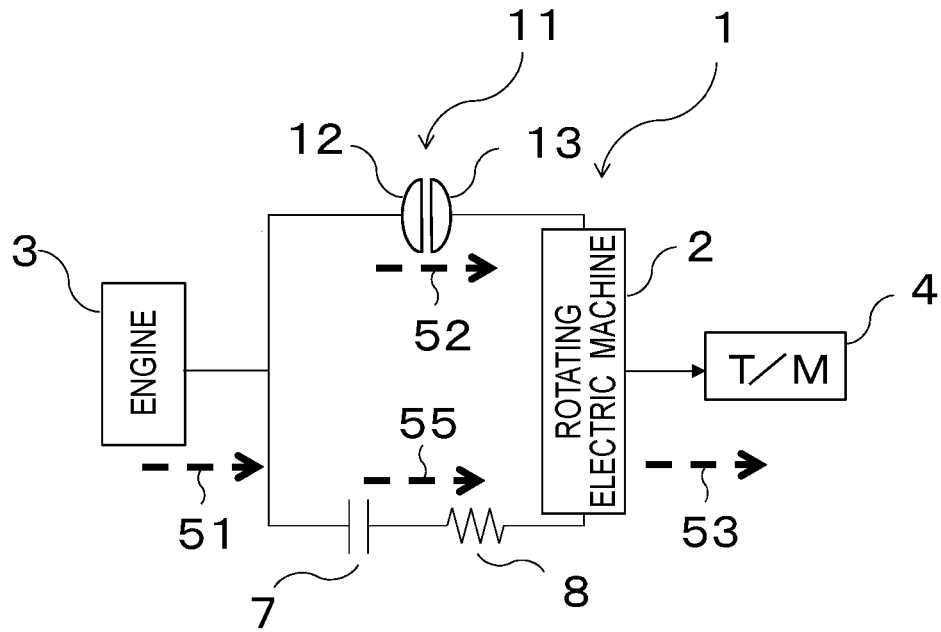
FIG. 8A is a schematic input path diagram of a vehicle drive apparatus of a fifth variation of the second embodiment illustrated in FIG. 2A.
Figure 8B:
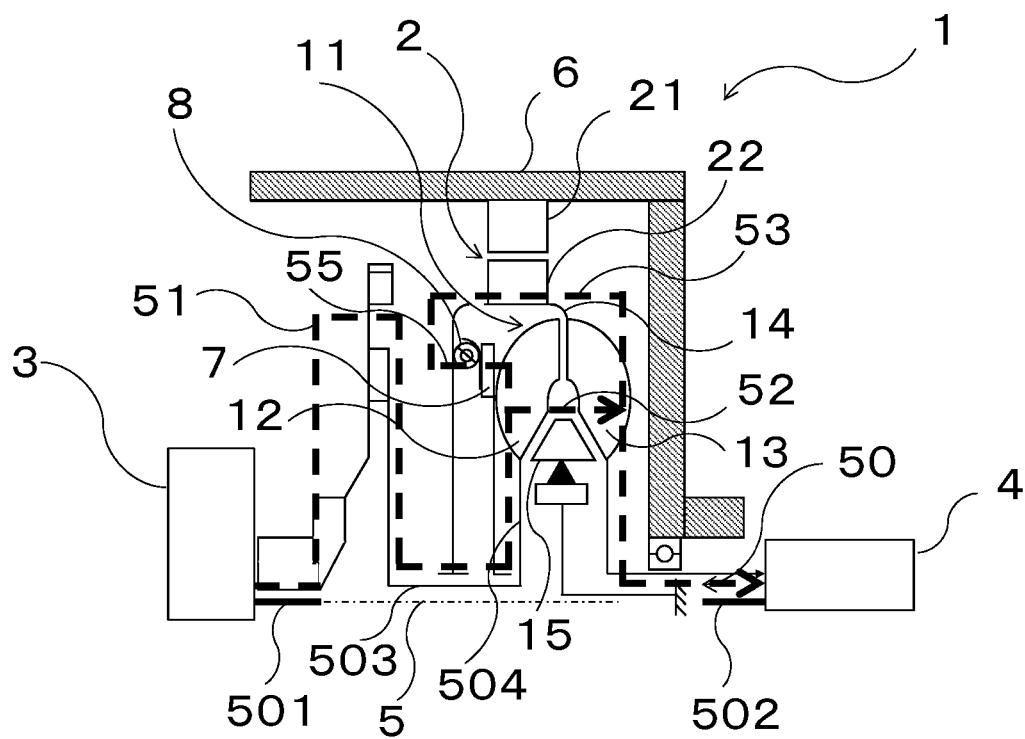
FIG. 8B is a schematic configuration diagram of the vehicle drive apparatus of the fifth variation of the second embodiment illustrated in FIG. 8A.
Figure 9A:
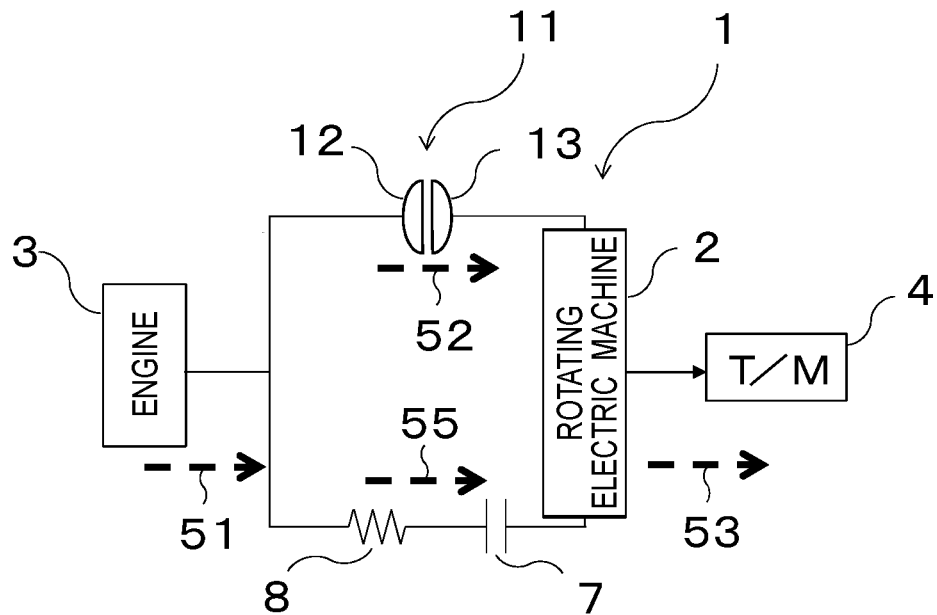
FIG. 9A is a schematic input path diagram of a vehicle drive apparatus of a sixth variation of the second embodiment illustrated in FIG. 2A.
Figure 9B:
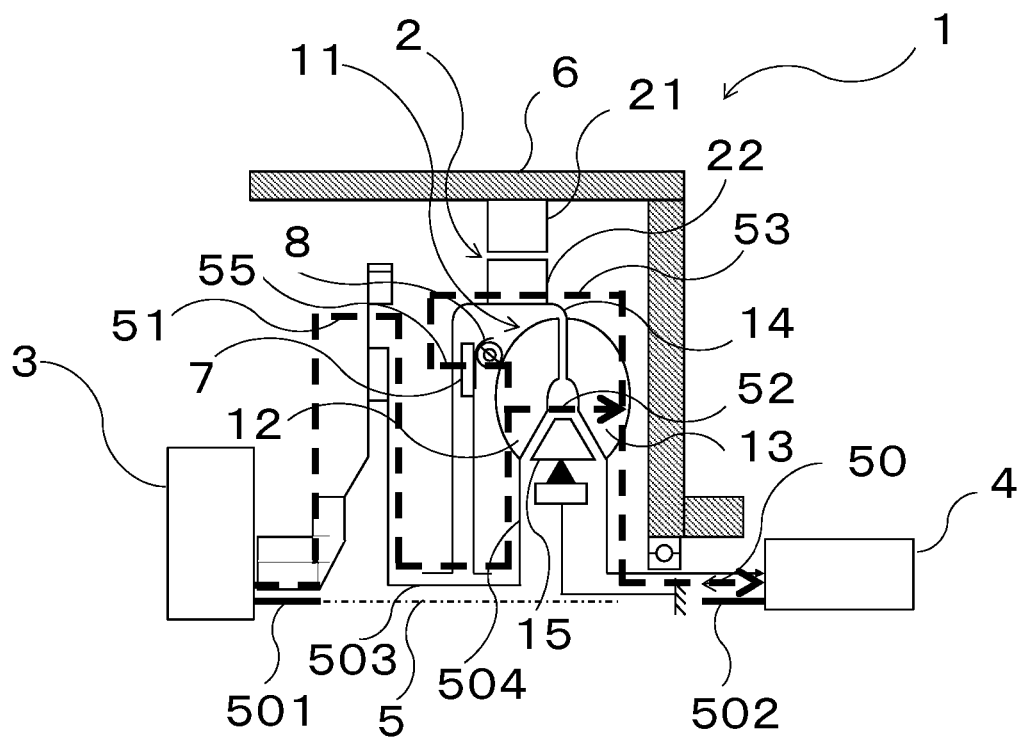
FIG. 9B is a schematic configuration diagram of the vehicle drive apparatus of the sixth variation of the second embodiment illustrated in FIG. 9A.

In FIGS. 8A and 8B, as the fifth variation, the damper mechanism 8 is arranged between the clutch element 7 and the third path 53, for example, the rotating electric machine 2. In FIGS. 9A and 9B, as the sixth variation, the damper mechanism 8 is arranged between the engine 3 and the clutch element 7. Also with such configuration, vibration generated in the engine 3 can be damped by the damper mechanism 8, and the vibration can be prevented from being transmitted to the rotating electric machine 2 and the transmission 4 via the fifth path 55 and the third path 53.

Third Embodiment

Figure 10A:
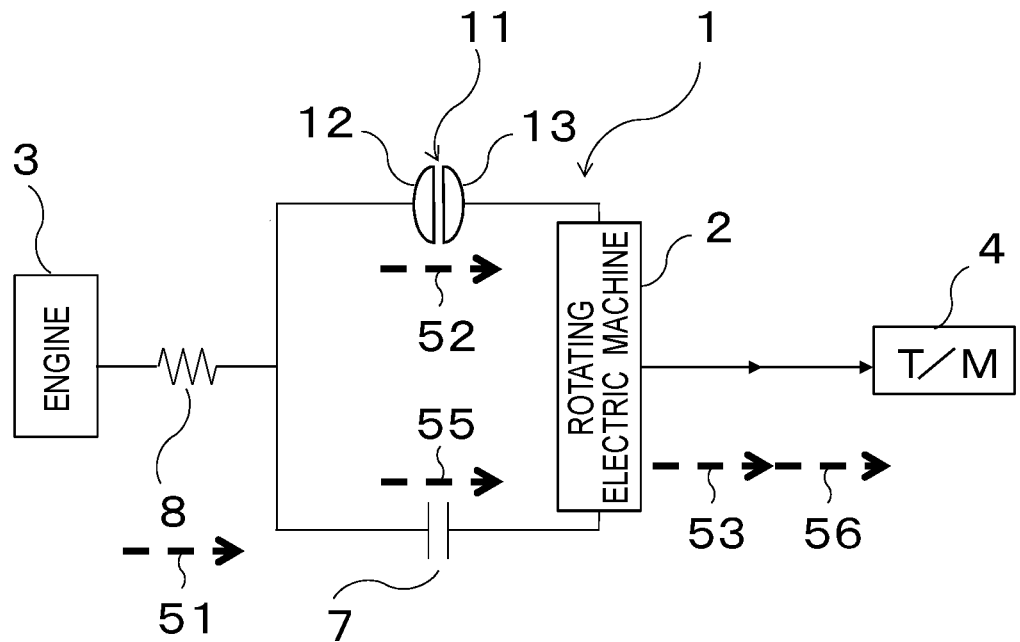
FIG. 10A is a schematic input path diagram of a vehicle drive apparatus according to a third embodiment of the present invention.
Figure 10B:
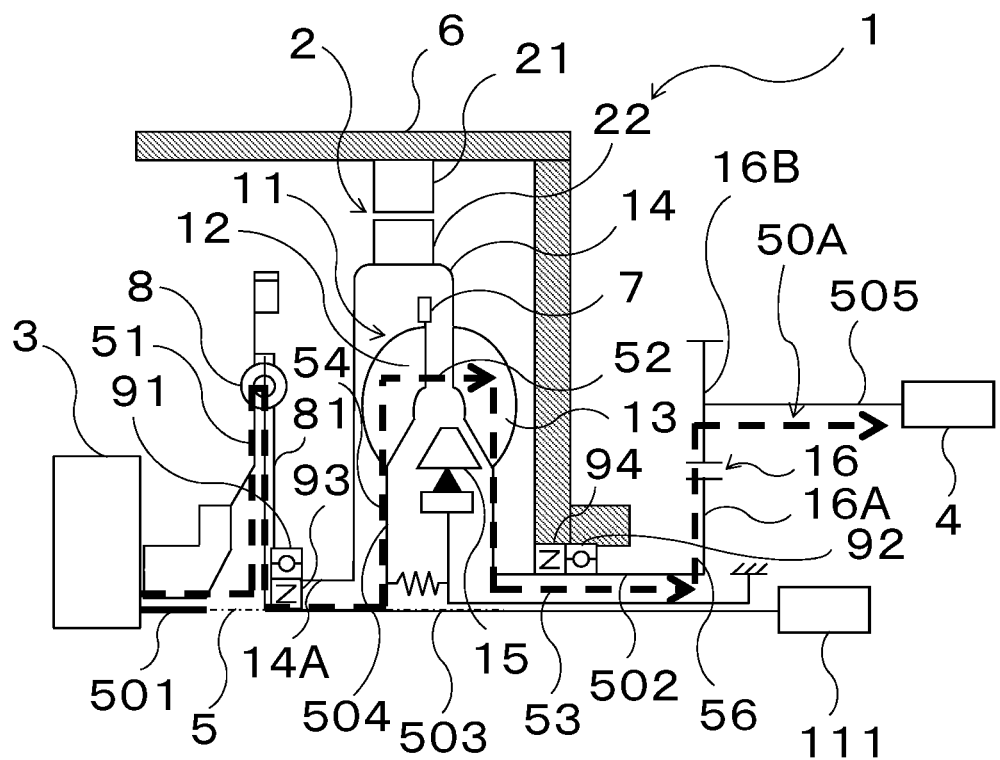
FIG. 10B is a schematic configuration diagram of the vehicle drive apparatus of FIG. 10A.

The vehicle drive apparatus 1 of the third embodiment of the present invention is different from that of the first embodiment in that the torque having been output from the outer shell 14 and the rotating electric machine 2 is transmitted to a sub-shaft 505 via the input shaft 502 of the transmission 4, as illustrated in FIG. 10B. In the third embodiment, identical parts as those in the first embodiment or the second embodiment are given the identical reference numerals and the description thereof is omitted, and differences from the first embodiment or the second embodiment are described.

The vehicle drive apparatus 1 of the third embodiment further includes a power transmission mechanism 16 and the sub-shaft 505. The power transmission mechanism 16 is arranged between the fluid coupling 11 and the transmission 4. The power transmission mechanism 16 is composed of, for example, a gear 16A fixed to the input shaft 502, and another gear 16B engaged with the gear 16A and fixed to the sub-shaft 505 having a rotation axis parallel to each other with the rotation axis of the input shaft 502 to transmit torque to the transmission 4. The power transmission mechanism 16 is not limited to such a gear mechanism, and may be, for example, a belt drive mechanism or a chain drive mechanism.

The sub-shaft 505 is arranged separately from the input shaft 502 of the transmission 4, and has a rotation axis parallel to each other with the rotation axis of the input shaft 502 of the transmission 4. That is, the torque having been output from the outer shell 14 of the fluid coupling 11 and the rotating electric machine 2 is transmitted to the sub-shaft 505 via the input shaft 502 and the power transmission mechanism 16. It is to be noted that "parallel" includes a state in which the sub-shaft 505 is substantially parallel to the input shaft 502 of the transmission 4.

The vehicle drive apparatus 1 of the third embodiment has a sixth path 56 for transmitting the torque having been output from the input shaft 502 to the transmission 4 via the power transmission mechanism 16 and the sub-shaft 505. That is, according to the vehicle drive apparatus 1 of the third embodiment, the torque having been output from the outer shell 14 and the rotating electric machine 2 is transmitted to the transmission 4 via the third path 53 and the sixth path 56 (see FIG. 10A). With such configuration, the arrangement position of the transmission 4 is not limited to the position on the input shaft 502 of the transmission 4, and it is possible to arrange the transmission 4 at a position other than the position on the input shaft 502 of the transmission 4 via the power transmission mechanism 16 and the sub-shaft 505, thereby improving the degree of freedom in design. As a result, an oil pump 111 driven by the input shaft 502 can be arranged in a space on the rotation axis of the input shaft 502 where the transmission 4 is not arranged, for example.

When the clutch element 7 to be described later and the outer shell 14 are separated from each other, the torque having been output from the engine 3 is transmitted to the transmission 4 via a power transmission path 50A composed of the first path 51, the second path 52, the third path 53, the fourth path 54, and the sixth path 56.

As illustrated in FIG. 10B, both axial end portions of the rotation axis 5 of the fluid coupling 11 are provided with a first bearing 91 and a second bearing 92. The first bearing 91 is supported by an input member 81 of the damper mechanism 8 and rotatably supports a shaft member 14A connected to the fluid coupling 11. The second bearing 92 is supported by the fixed portion 6 between the turbine 13 and the transmission 4 and rotatably supports the input shaft 502. In other words, the fluid coupling 11 is rotatably supported by the first bearing 91 supported by the damper mechanism 8 and the second bearing 92 supported by a non-rotation member. With such configuration, the fluid coupling 11 is positioned by the first bearing 91 and the second bearing 92 sandwiching both axial end portions of the rotation axis 5 of the fluid coupling 11, and hence the fluid coupling 11 can be restricted from expanding in the axial direction by the fluid pressure, thereby allowing deformation to be suppressed. The vehicle drive apparatus 1 further includes a first sealing portion 93 and a second sealing portion 94 adjacent to the first bearing 91 and the second bearing 92, respectively. The first sealing portion 93 and the second sealing portion 94 seal the outflow of oil from the inside of the fluid coupling 11 and the transmission 4.

Figure 10C:
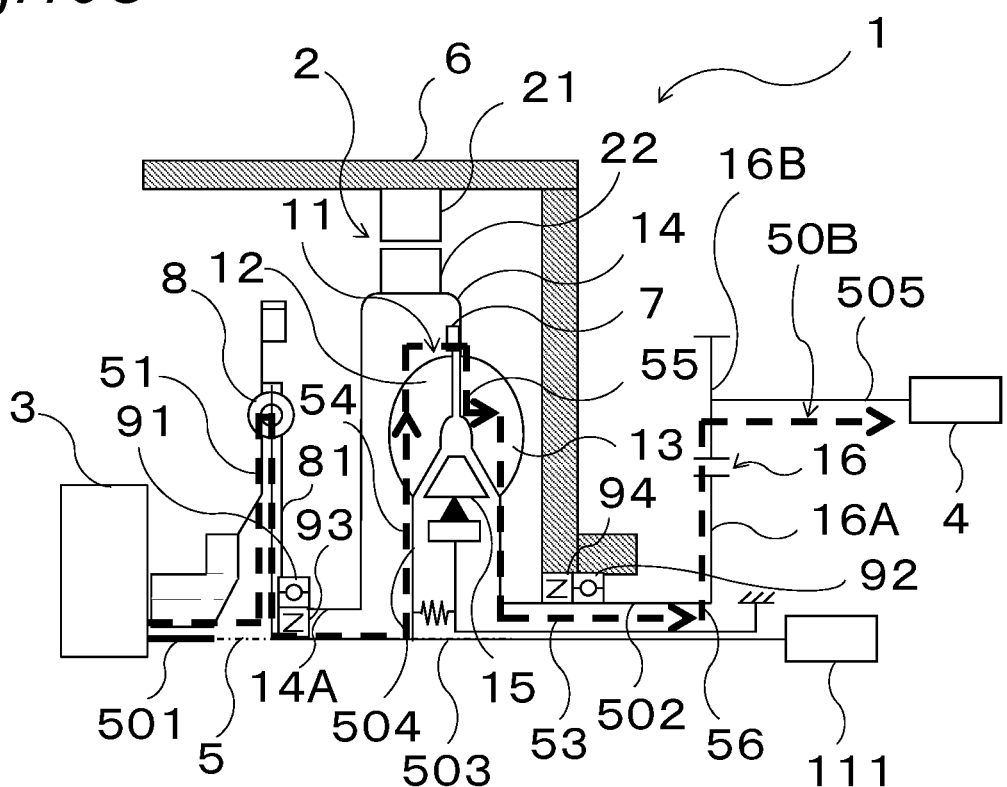
FIG. 10C is a schematic configuration diagram illustrating a state in which a clutch element of the vehicle drive apparatus of FIG. 10A is fastened with an outer shell.

As illustrated in FIG. 10C, in the vehicle drive apparatus 1 of the third embodiment, the clutch element 7 is provided integrally with the impeller 12 in the fluid coupling 11 while facing the outer shell 14 so as to be able to come into contact with and separate from the outer shell 14. The clutch element 7 slides along the rotation axis 5 in a direction from the impeller 12 towards the turbine 13, and connects the clutch element 7 and the outer shell 14 so as to be able to come into contact with and separate from each other. The clutch element 7 and the outer shell 14 are fastened with each other by friction engagement. By fastening the clutch element 7 and the outer shell 14 with each other, the torque having been output from the engine 3 is transmitted to the transmission 4 not via the second path 52 but via a power transmission path 50B composed of the first path 51, the third path 53, the fourth path 54, the fifth path 55, and the sixth path 56.

Similar to the clutch element 7 in the second embodiment, the clutch element 7 in the third embodiment is fastened or released depending on the operation mode when the engine is driven, and released at the time of energy regeneration. The clutch element 7 may be either normally closed or normally open.

According to the third embodiment, by fastening the clutch element 7 and the outer shell 14 with each other, it is possible to prevent the torque transmission efficiency from deteriorating due to slippage occurred in the fluid coupling 11, and to improve the fuel economy of the vehicle. The clutch element 7 slides in the same direction as the fluid flow in the direction of flowing into the fluid coupling 11 when the clutch element 7 is fastened with the outer shell 14, specifically, from the impeller 12 towards the turbine 13, thereby allowing drop of the responsiveness to be suppressed.

(Variations)

Figure 11A:
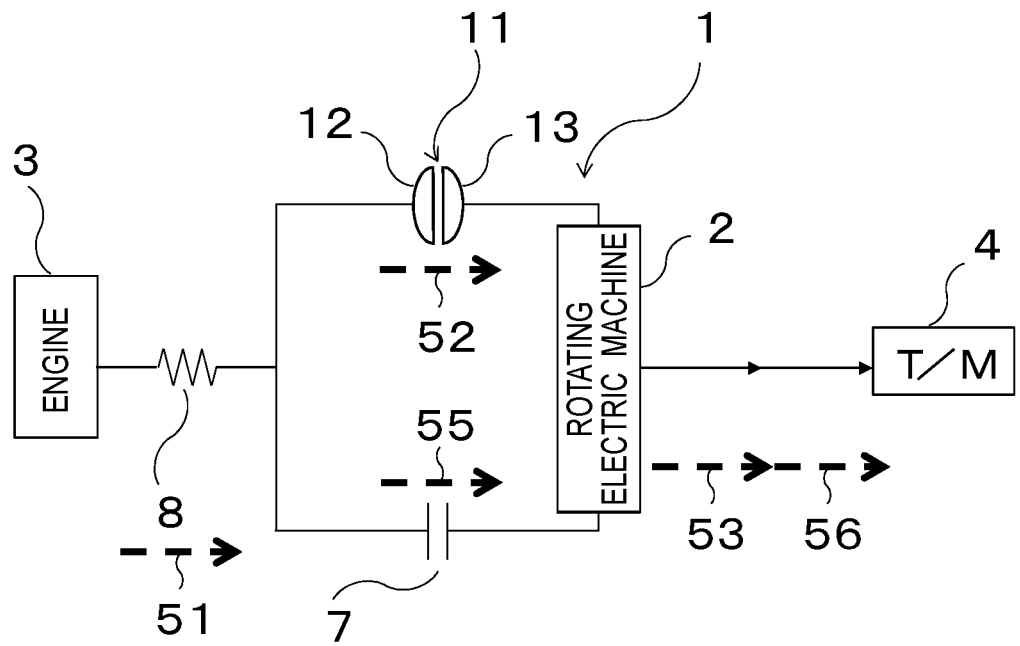
FIG. 11A is a schematic input path diagram of a vehicle drive apparatus of the first variation of the third embodiment illustrated in FIG. 10A.
Figure 11B:
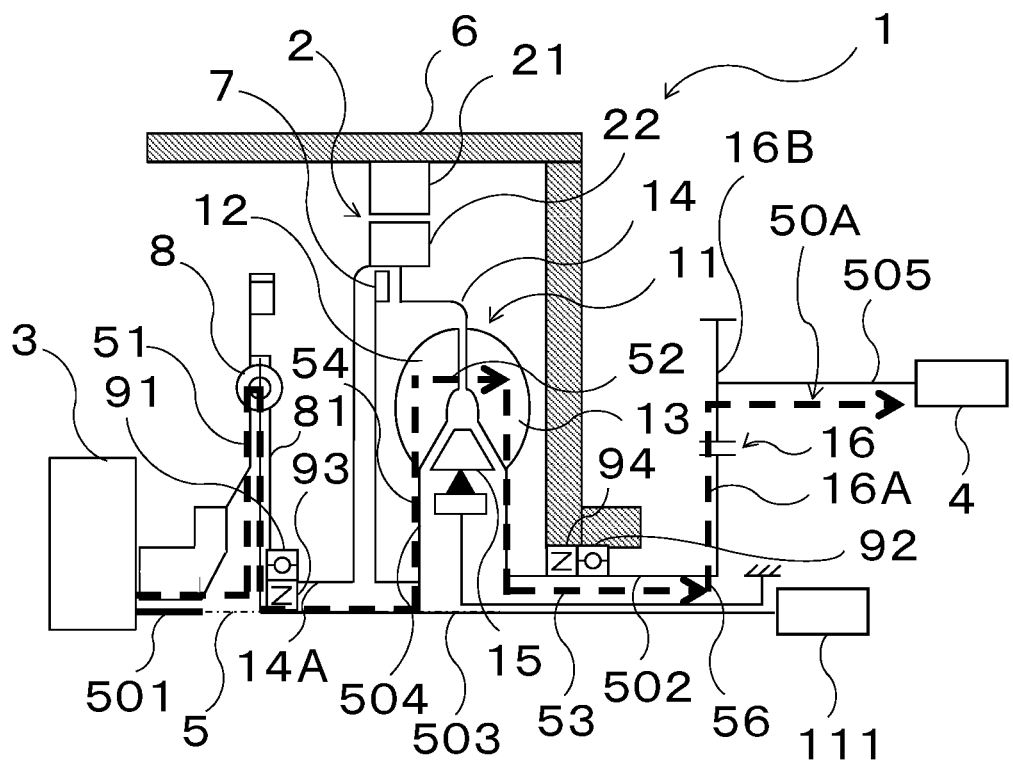
FIG. 11B is a schematic configuration diagram of the vehicle drive apparatus of FIG. 11A.
Figure 11C:
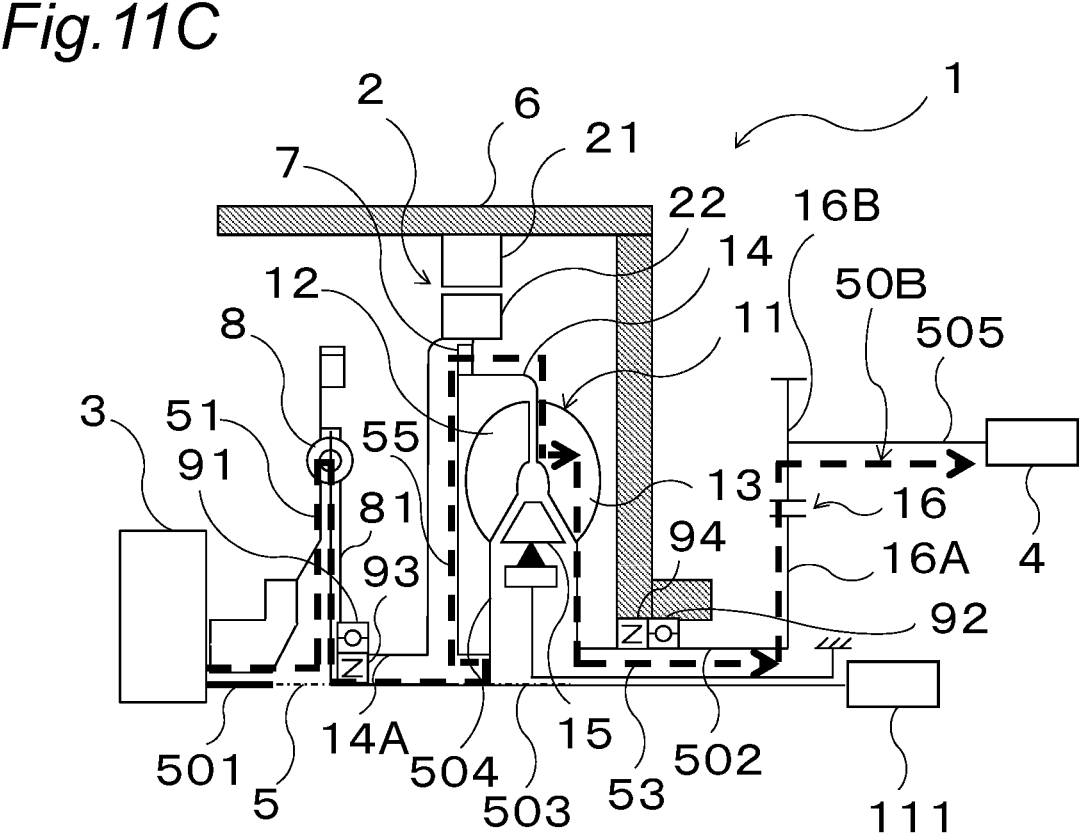
FIG. 11C is a schematic configuration diagram illustrating a state in which the clutch element of the vehicle drive apparatus of FIG. 11A is fastened with the outer shell.

In the vehicle drive apparatus 1, as the first variation of the third embodiment, as illustrated in FIGS. 11B and 11C, the clutch element 7 may be arranged to face the outer shell 14 so as to be able to come into contact with and separate from the outer shell 14, on an upstream side of the fluid coupling 11 relative to the impeller 12 in the fluid coupling 11, separately from the impeller 12. According to the vehicle drive apparatus 1 of the first variation of the third embodiment, similarly to the vehicle drive apparatus 1 of the third embodiment, the torque having been output from the outer shell 14 and the rotating electric machine 2 is transmitted to the transmission 4 via the third path 53 and the sixth path 56 (see FIG. 11A).

Also with such configuration, by fastening the clutch element 7 and the outer shell 14 with each other, it is possible to prevent the torque transmission efficiency from deteriorating due to slippage occurred in the fluid coupling 11, and to improve the fuel economy of the vehicle.

Figure 12:
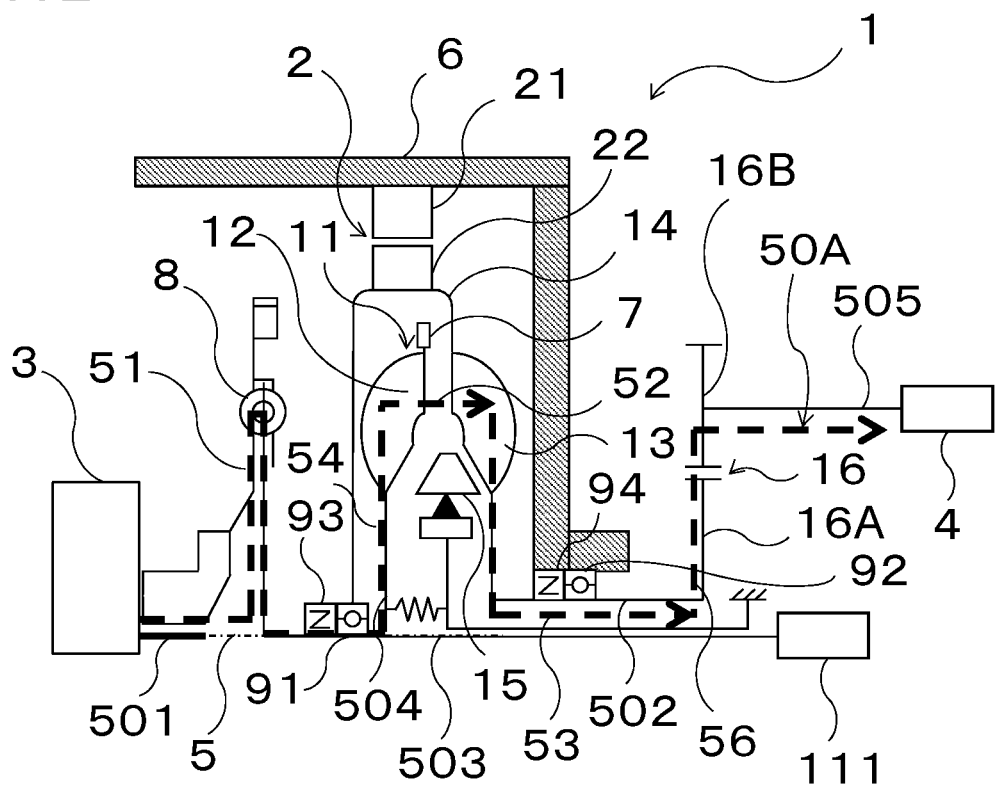
FIG. 12 is a schematic configuration diagram of the vehicle drive apparatus of a second variation of the third embodiment illustrated in FIG. 10A.
Figure 13:
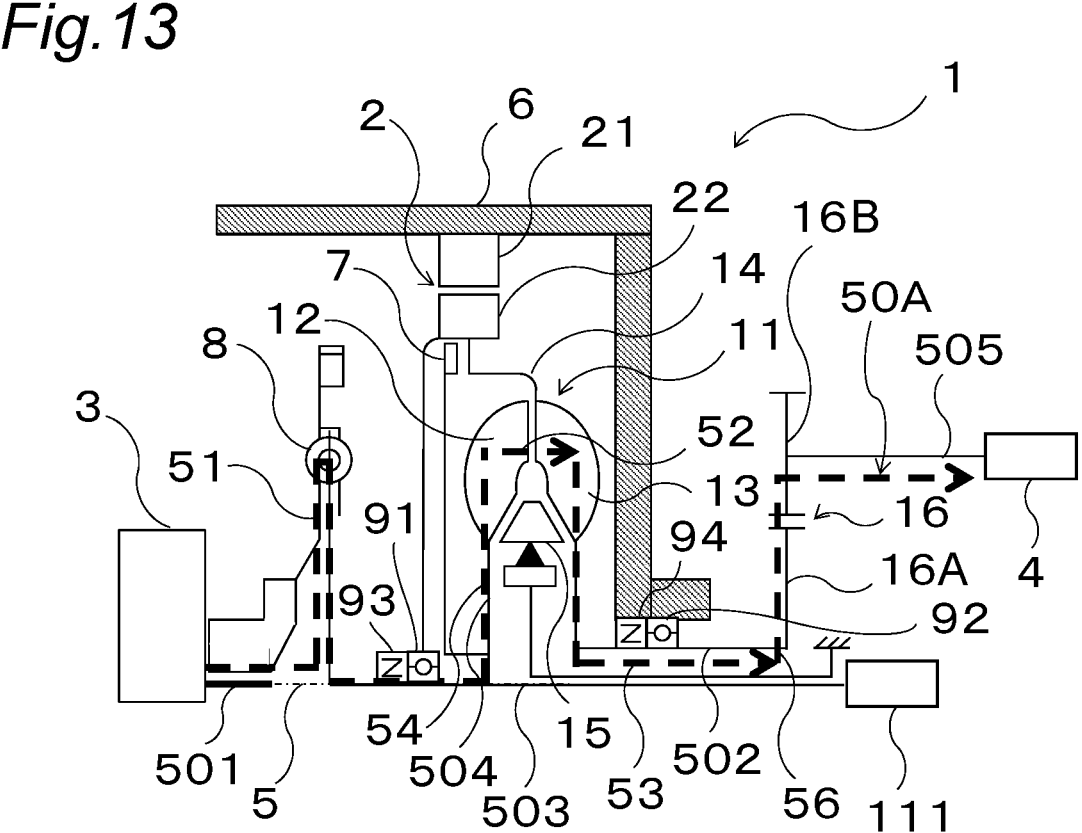
FIG. 13 is a schematic configuration diagram of the vehicle drive apparatus of a third variation of the third embodiment illustrated in FIG. 10A.

As the second and the third variations of the third embodiment, as illustrated in FIGS. 12 and 13, the first bearing 91 supported by the outer shell 14 and rotatably supporting the transmission member 503 may be arranged in the fluid of the fluid coupling 11. For example, the first bearing 91 may be arranged in the fluid coupling 11 near the rotation axis portion of the outer shell 14 on the upstream side of the fluid coupling 11 relative to the impeller 12. With such configuration, heat generated in the first bearing 91 can be dissipated via the fluid of the fluid coupling 11, and support stiffness of the transmission member 503 can be improved.

Fourth Embodiment

Figure 14A:
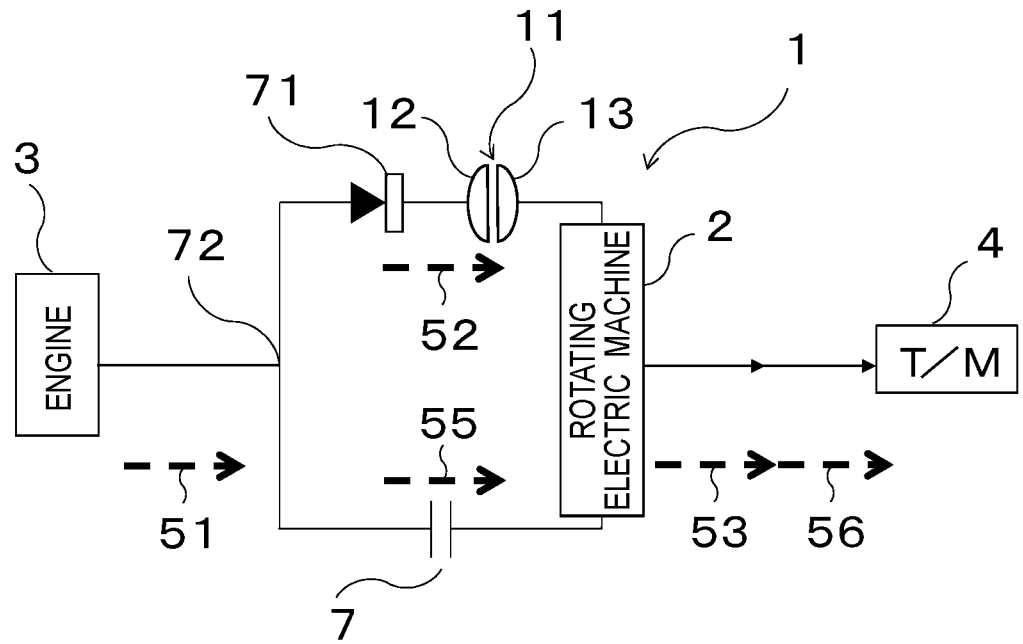
FIG. 14A is a schematic input path diagram of a vehicle drive apparatus according to a fourth embodiment of the present invention.

The vehicle drive apparatus 1 of the fourth embodiment of the present invention is different from that of the first embodiment in terms of including a one-way clutch 71 as illustrated in FIG. 14A. In the fourth embodiment, identical parts as those in the first to the third embodiments are given the identical reference numerals and the description thereof is omitted, and differences from the first to the third embodiments are described.

Figure 14B:
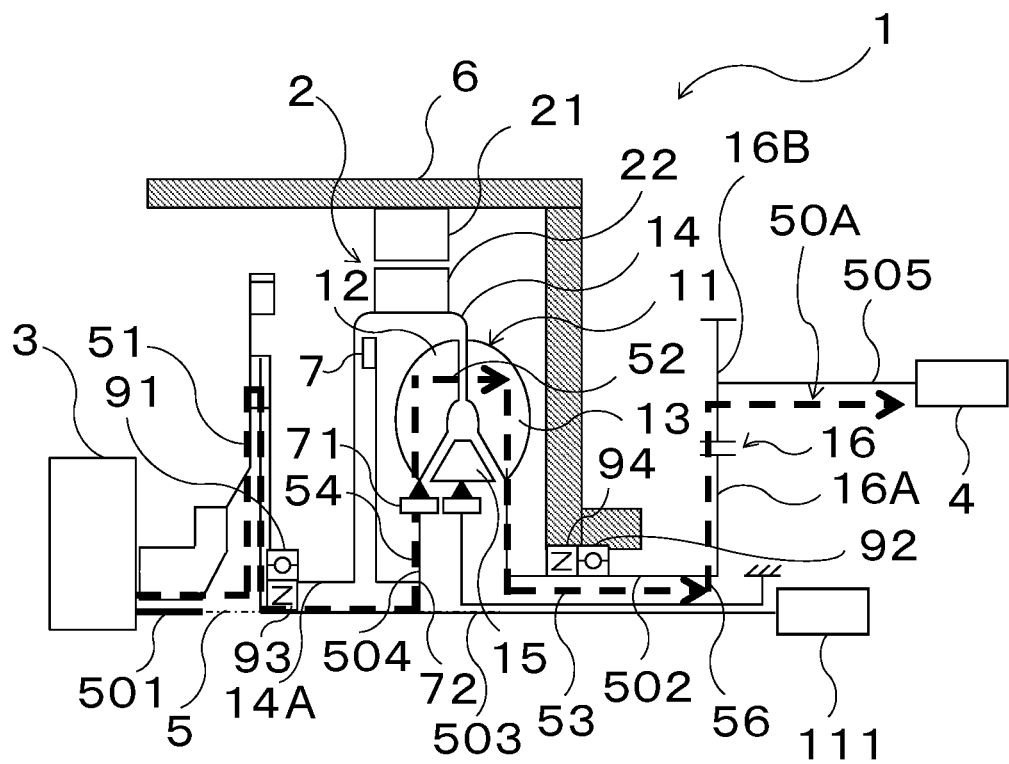
FIG. 14B is a schematic configuration diagram of the vehicle drive apparatus of FIG. 14A.

In the vehicle drive apparatus 1 of the fourth embodiment, as illustrated in FIG. 14B, the one-way clutch 71 is arranged so as to be adjacent to the engine 3 side of the impeller 12. In other words, the one-way clutch 71 is arranged between the radial connection member 504 and the impeller 12. The intermediate portion of the radial connection member 504 is provided with a branch point 72. In the fourth embodiment, the branch point 72 means a location where the transmission path of torque is divided in order to transmit the torque having been output from the engine 3 to the impeller 12 or the clutch element 7. The one-way clutch 71 transmits only torque to be input from the engine 3 side to the one-way clutch 71 and to be output from the one-way clutch 71 to the impeller 12 side. According to such configuration, it is possible to prevent torque from being transmitted in a direction from the impeller 12 towards the engine 3. As a result, it is possible to suppress deterioration of energy regeneration efficiency by the rotating electric machine 2 due to drag torque generated when the rotation speed of the turbine 13 exceeds the rotation speed of the impeller 12 during vehicle deceleration. The one-way clutch 71 may be arranged on the radial connection member 504 between the branch point 72 and the impeller 12 without being adjacent to the engine 3 side of the impeller 12.

According to the vehicle drive apparatus 1 of the fourth embodiment, the torque having been output from the engine 3 is transmitted to the impeller 12 via the output shaft 501 of the engine 3, the transmission member 503, the radial connection member 504, and the one-way clutch 71 in this order. This is a torque transmission path similar to the first path 51 in the first to the third embodiments.

Figure 14C:
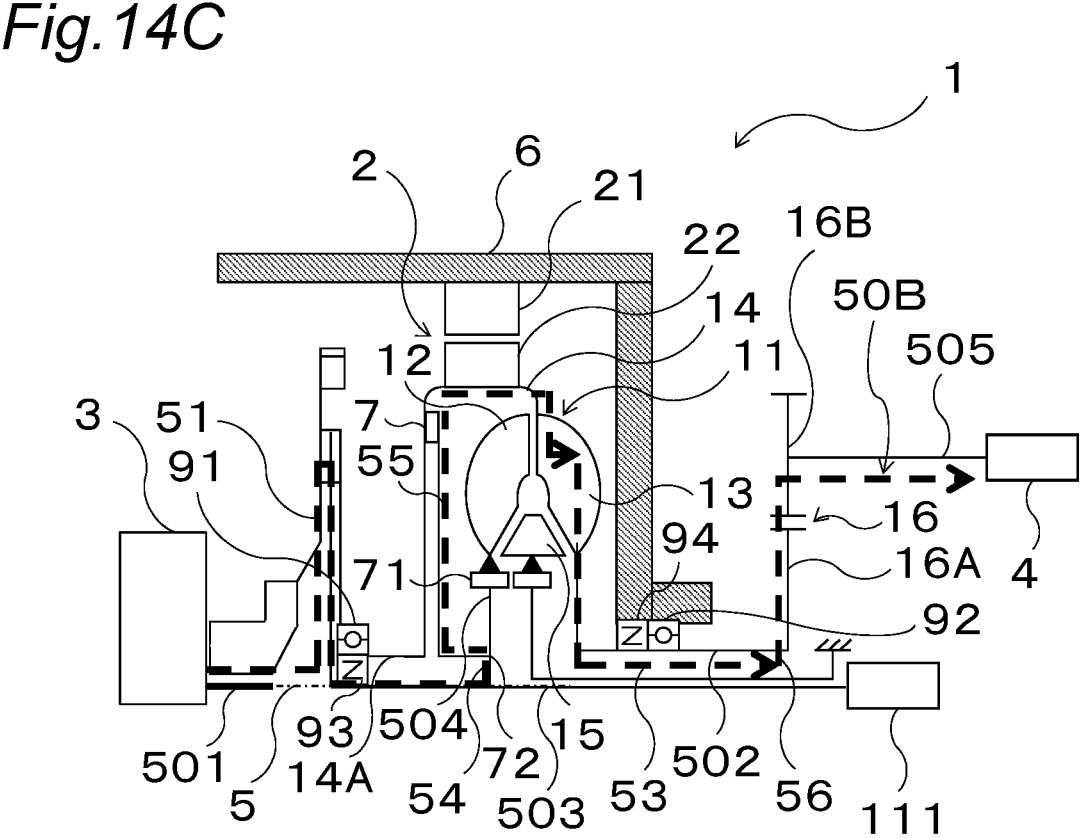
FIG. 14C is a schematic configuration diagram illustrating a state in which the clutch element of the vehicle drive apparatus of FIG. 14A is fastened with the outer shell.

According to the vehicle drive apparatus 1 of the fourth embodiment, as illustrated in FIG. 14C, the clutch element 7 is arranged to face the outer shell 14 so as to be able to come into contact with and separate from the outer shell 14, on the upstream side of the fluid coupling 11 relative to the impeller 12 in the fluid coupling 11, separately from the impeller 12. The clutch element 7 slides along the rotation axis 5 in a direction from the impeller 12 towards the engine 3, and connects the clutch element 7 and the outer shell 14 so as to be able to come into contact with and separate from each other. The clutch element 7 and the outer shell 14 are fastened with each other by friction engagement. By fastening the clutch element 7 and the outer shell 14 with each other, the torque having been output from the engine 3 is transmitted to the transmission 4 not via the second path 52 but via a power transmission path 50B composed of the first path 51, the third path 53, the fourth path 54, the fifth path 55, and the sixth path 56. According to such configuration, the clutch element 7 and the output side of the fluid coupling 11 can be engaged with each other via the outer shell 14, thereby allowing an engine brake to be used.

Furthermore, according to the vehicle drive apparatus 1 of the fourth embodiment, as illustrated in FIGS. 14B and 14C, the position of the outermost end in the radial direction of the clutch element 7 can be made similar to the position of the outermost end in the radial direction of the fluid coupling 11. According to such configuration, the position of the outermost end in the radial direction of the clutch element 7 becomes inside in the radial direction as compared with the third variation of the third embodiment illustrated in FIG. 13. As a result, the space occupied by the rotating electric machine 2 can be made larger, and the output of the rotating electric machine 2 can be improved.

(Variations)

Figure 15A:
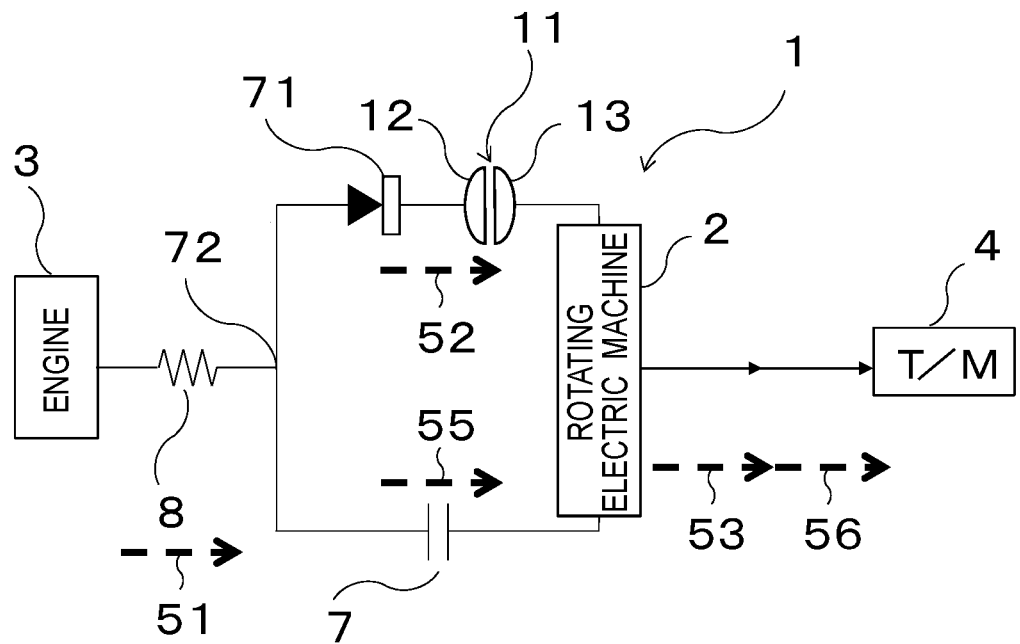
FIG. 15A is a schematic input path diagram of a vehicle drive apparatus of a first variation of the fourth embodiment illustrated in FIG. 14A.
Figure 15B:
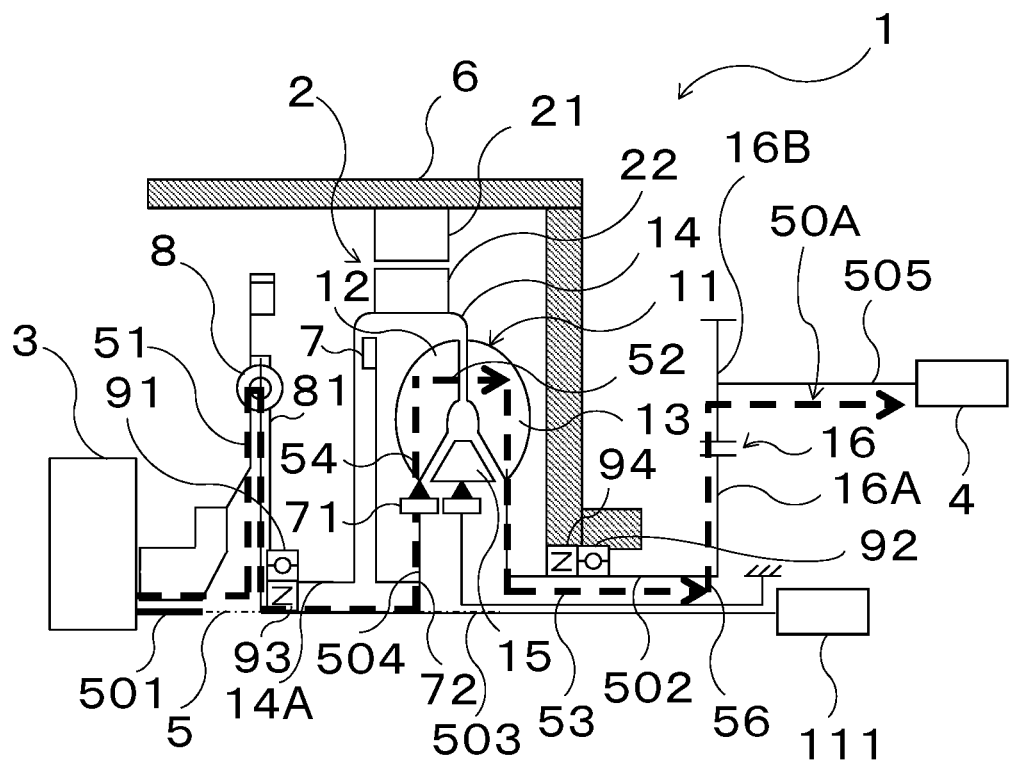
FIG. 15B is a schematic configuration diagram of the vehicle drive apparatus of the first variation of the fourth embodiment illustrated in FIG. 15A.

In the vehicle drive apparatus 1, as the first variation of the fourth embodiment, as illustrated in FIGS. 15A and 15B, the damper mechanism 8 may be arranged on the first path 51 between the engine 3, and the fluid coupling 11 and the clutch element 7. According to such configuration, the vibration generated in the engine 3 can be damped while suppressing the energy regeneration efficiency by the rotating electric machine 2 from deteriorating. As a result, it is possible to prevent the vibration generated in the engine 3 from being transmitted to the rotating electric machine 2 and the transmission 4 via the second path 52 and the third path 53 or via the fifth path 55 and the third path 53.

As the second and the third variations of the fourth embodiment, as illustrated in FIGS. 16A to 17B, the damper mechanism 8 may be arranged in series with the clutch element 7 on a transmission path between the engine 3 and the third path 53, for example, the rotating electric machine 2.

Figure 16A:
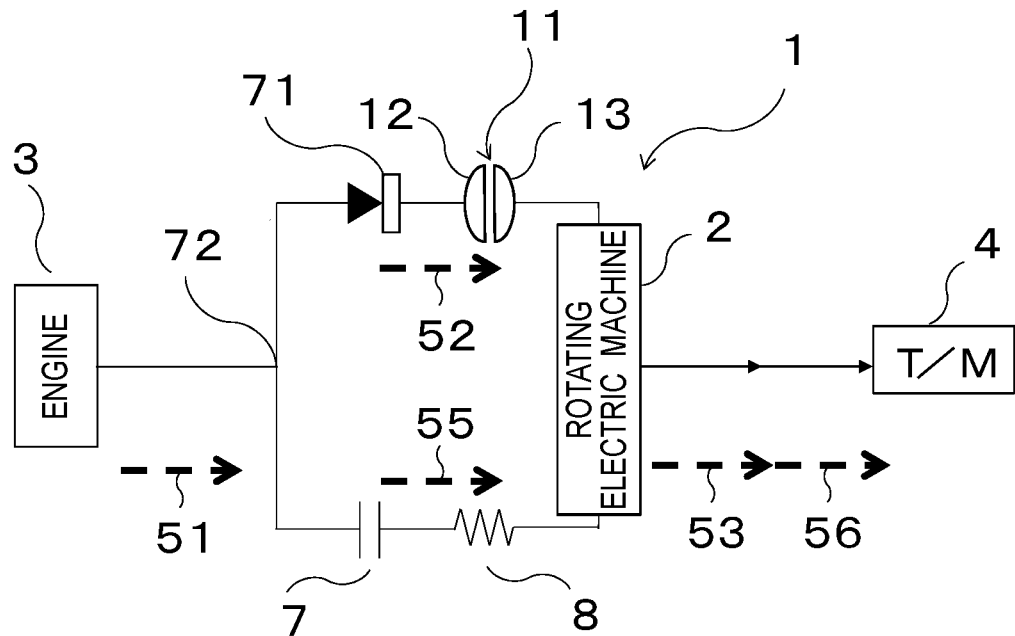
FIG. 16A is a schematic input path diagram of a vehicle drive apparatus of the second variation of the fourth embodiment illustrated in FIG. 14A.
Figure 16B:
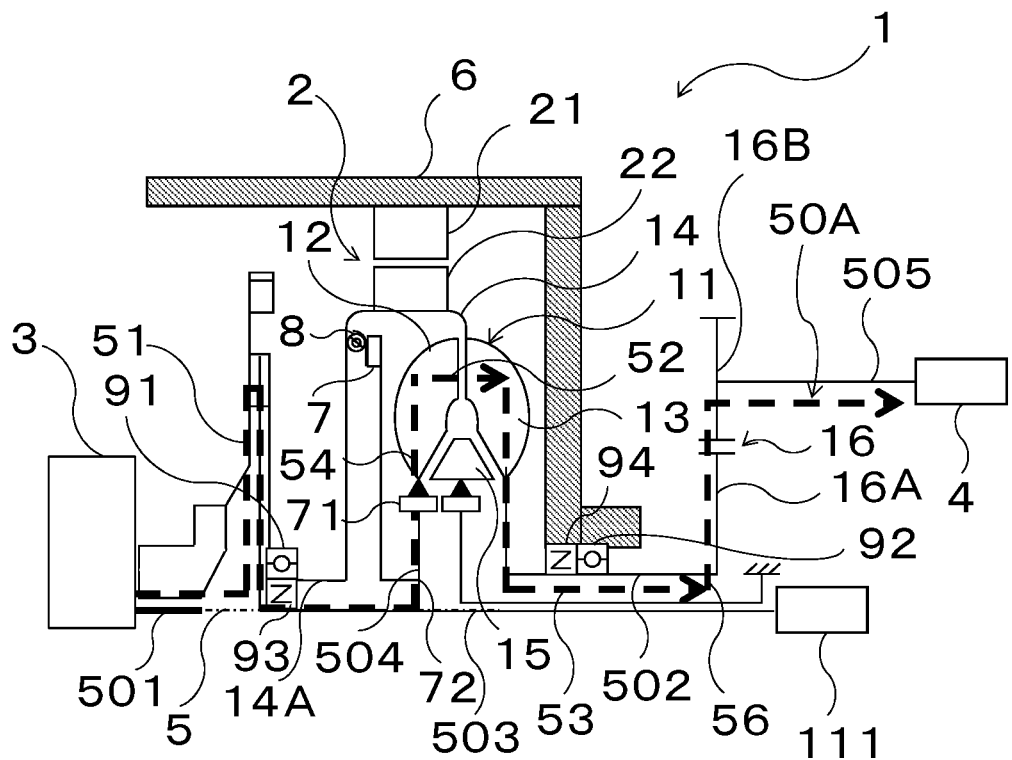
FIG. 16B is a schematic configuration diagram of the vehicle drive apparatus of the second variation of the fourth embodiment illustrated in FIG. 16A.
Figure 17A:
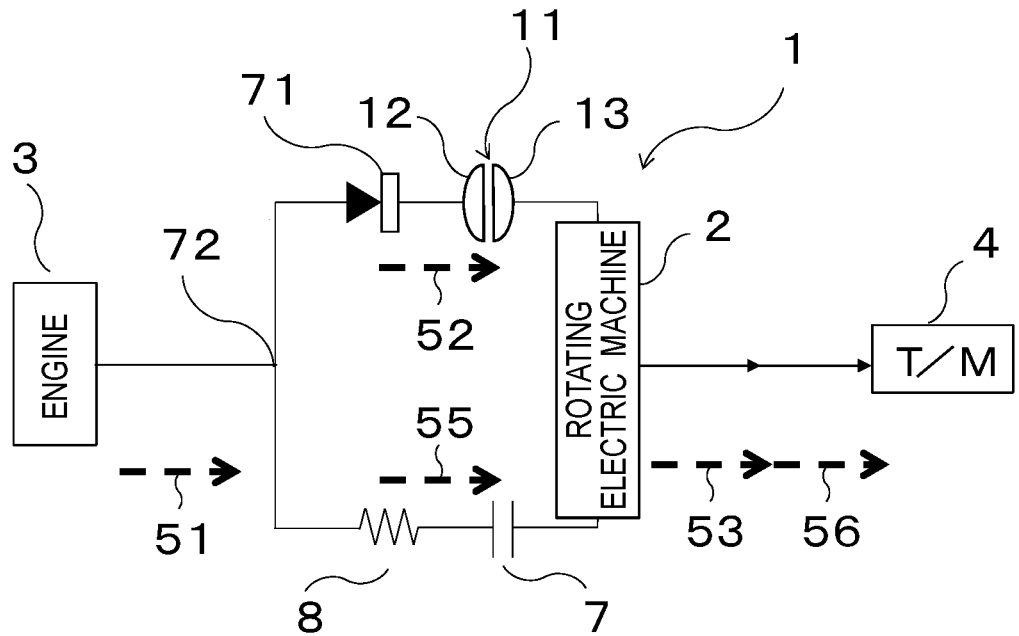
FIG. 17A is a schematic input path diagram of a vehicle drive apparatus of a third variation of the fourth embodiment illustrated in FIG. 14A.
Figure 17B:
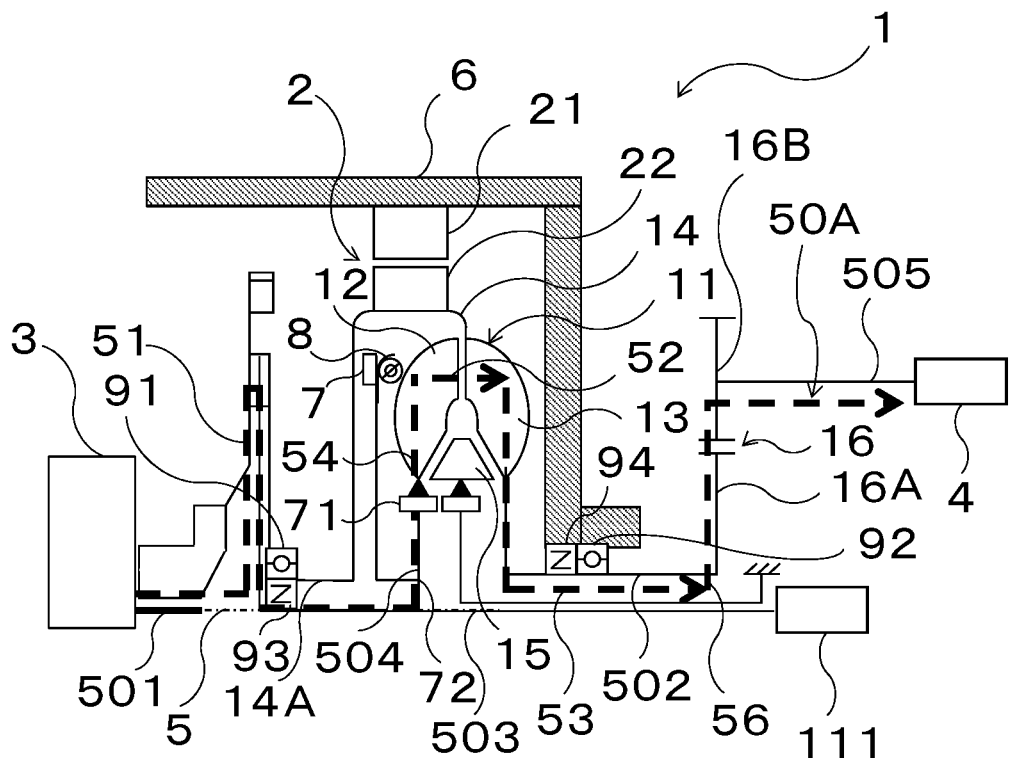
FIG. 17B is a schematic configuration diagram of the vehicle drive apparatus of the third variation of the fourth embodiment illustrated in FIG. 17A.

In FIGS. 16A and 16B, as the second variation, the damper mechanism 8 is arranged between the clutch element 7 and the third path 53, for example, the rotating electric machine 2. In FIGS. 17A and 17B, as the third variation, the damper mechanism 8 is arranged between the engine 3 and the clutch element 7. Also with such configurations, it is possible to suppress deterioration of energy regeneration efficiency by the rotating electric machine 2. Furthermore, in the second and third variations of the fourth embodiment, the damper mechanism 8 is a wet damper arranged inside the fluid coupling 11, and hence the vibration generated in the engine 3 can be further damped by the damper mechanism 8. As a result, the vibration generated in the engine 3 can be prevented from being transmitted to the rotating electric machine 2 and the transmission 4 via the fifth path 55 and the third path 53.

Figure 18A:
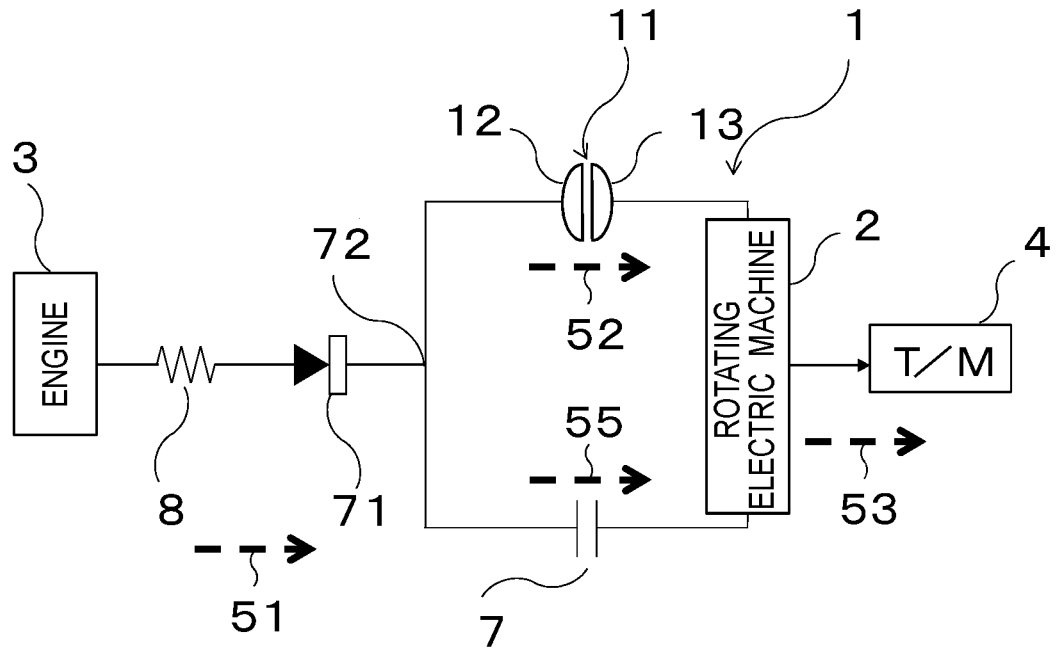
FIG. 18A is a schematic input path diagram of a vehicle drive apparatus of a fourth variation of the fourth embodiment illustrated in FIG. 14A.
Figure 18B:
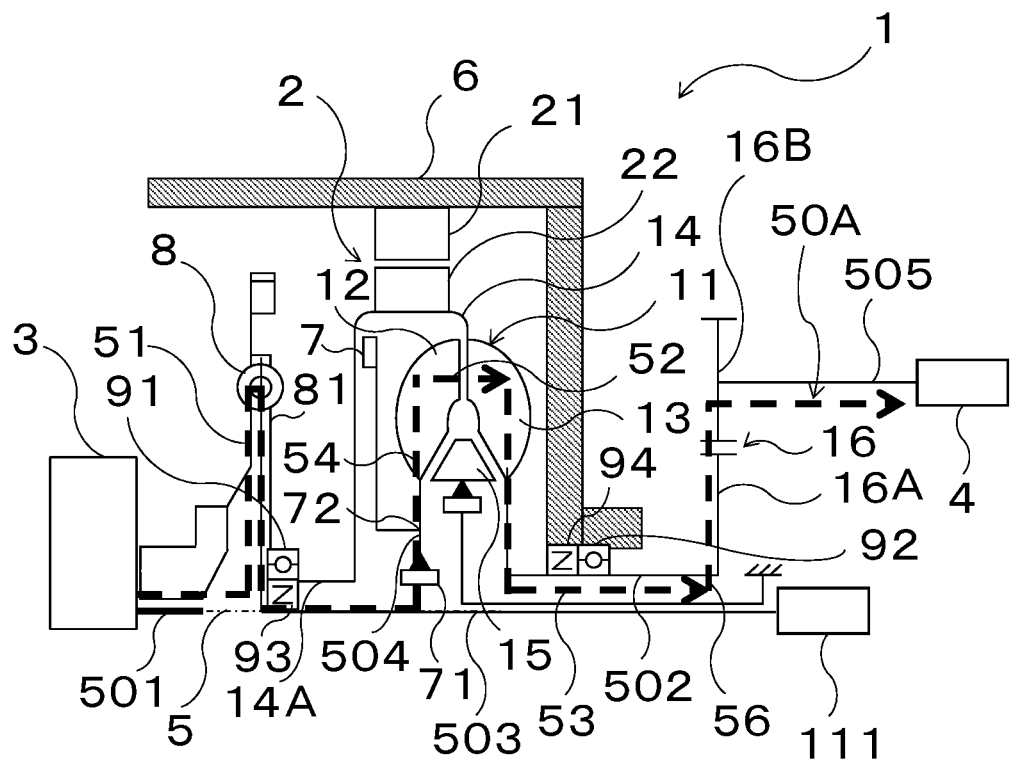
FIG. 18B is a schematic configuration diagram of the vehicle drive apparatus of the fourth variation of the fourth embodiment illustrated in FIG. 18A.

As the fourth variation of the fourth embodiment, as illustrated in FIGS. 18A and 18B, the damper mechanism 8 may be arranged on the first path 51 between the engine 3, and the fluid coupling 11 and the clutch element 7. According to such configuration, the vehicle drive apparatus 1 has a simpler structure than that in the case where the one-way clutch 71 is arranged between the branch point 72 and the impeller 12, and it is possible to suppress deterioration of energy regeneration efficiency by the rotating electric machine 2. Vibration generated in the engine 3 can be damped, and this vibration can be prevented from being transmitted to the rotating electric machine 2 and the transmission 4 via the second path 52 and the third path 53 or via the fifth path 55 and the third path 53.

Fifth Embodiment

Figure 19A:
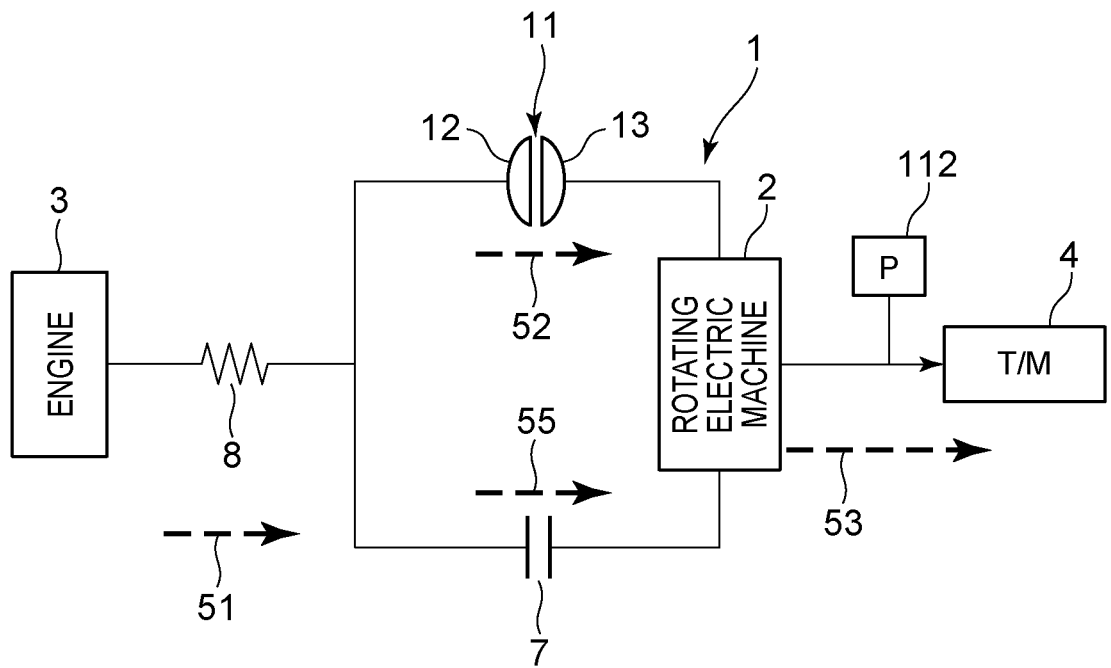
FIG. 19A is a schematic input path diagram of a vehicle drive apparatus according to a fifth embodiment of the present invention.

The vehicle drive apparatus 1 of the fifth embodiment of the present invention is different from that of the first embodiment in terms of including an oil pump 112 as illustrated in FIG. 19A. In the fifth embodiment, identical parts as those in the first to the fourth embodiments are given the identical reference numerals and the description thereof is omitted, and differences from the first to the fourth embodiments are described.

Figure 19B:
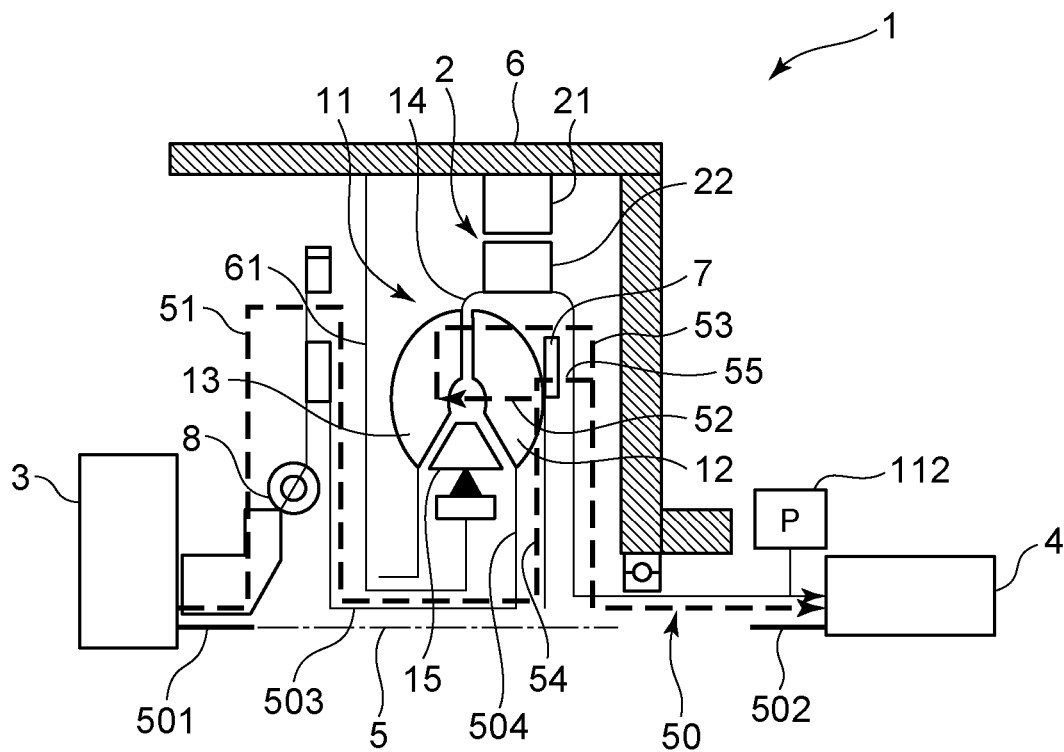
FIG. 19B is a schematic configuration diagram of the vehicle drive apparatus illustrated in FIG. 19A.
Figure 20A:
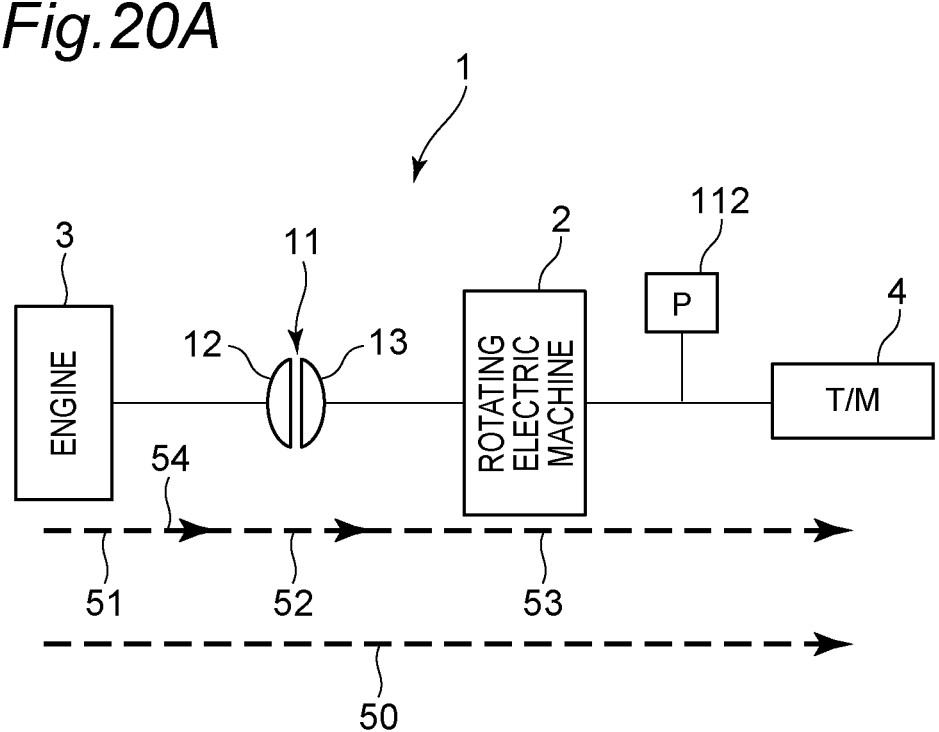
FIG. 20A is a schematic input path diagram of a vehicle drive apparatus of FIG. 1A with a pump added thereto.
Figure 20B:
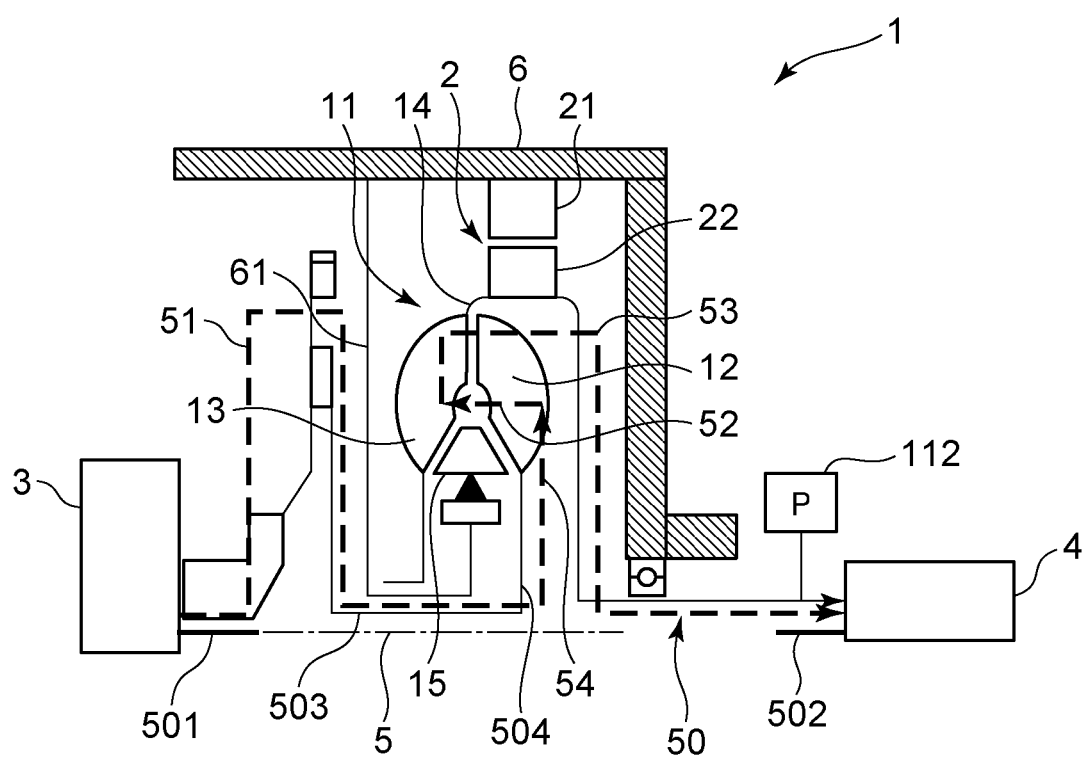
FIG. 20B is a schematic configuration diagram of the vehicle drive apparatus illustrated in FIG. 20A.
Figure 21A:
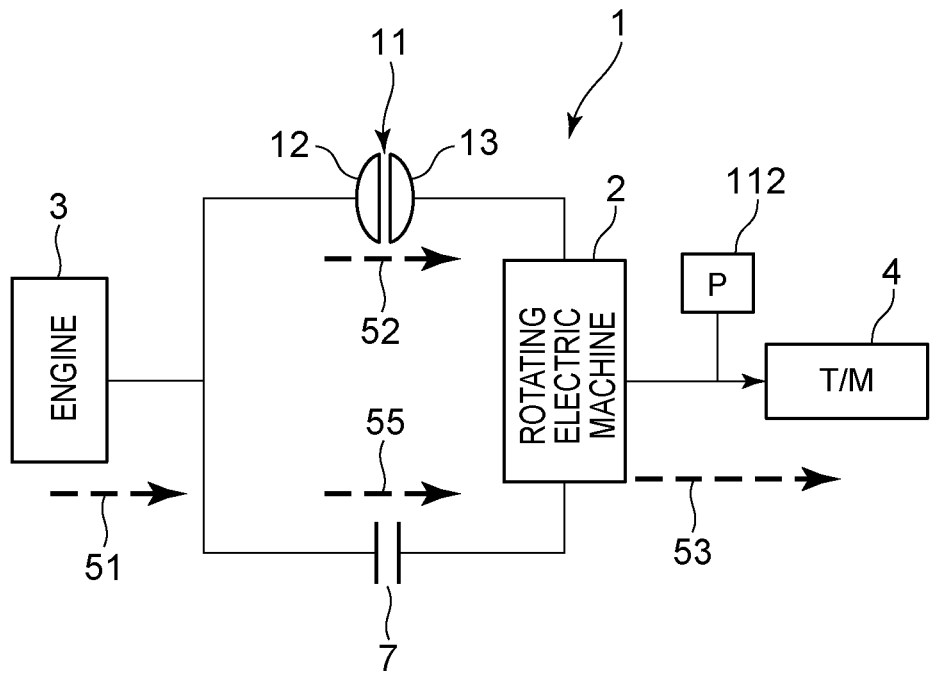
FIG. 21A is a schematic input path diagram of a vehicle drive apparatus of FIG. 2A with a pump added thereto.
Figure 21B:
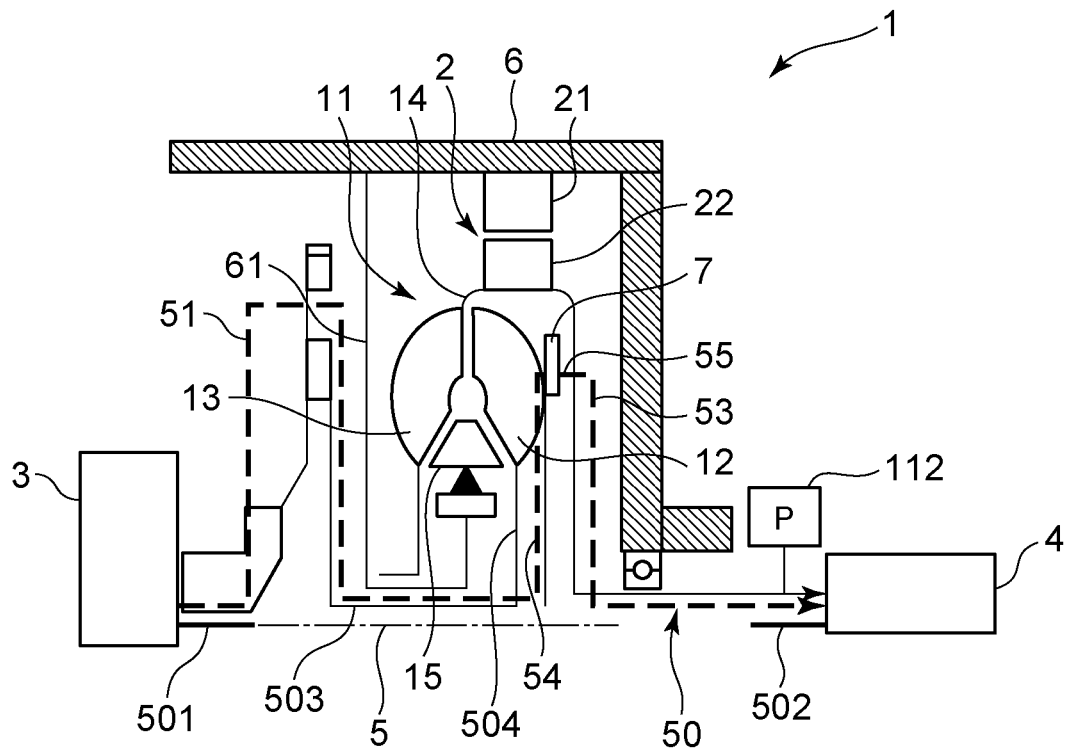
FIG. 21B is a schematic configuration diagram of the vehicle drive apparatus illustrated in FIG. 21A.
Figure 22A:
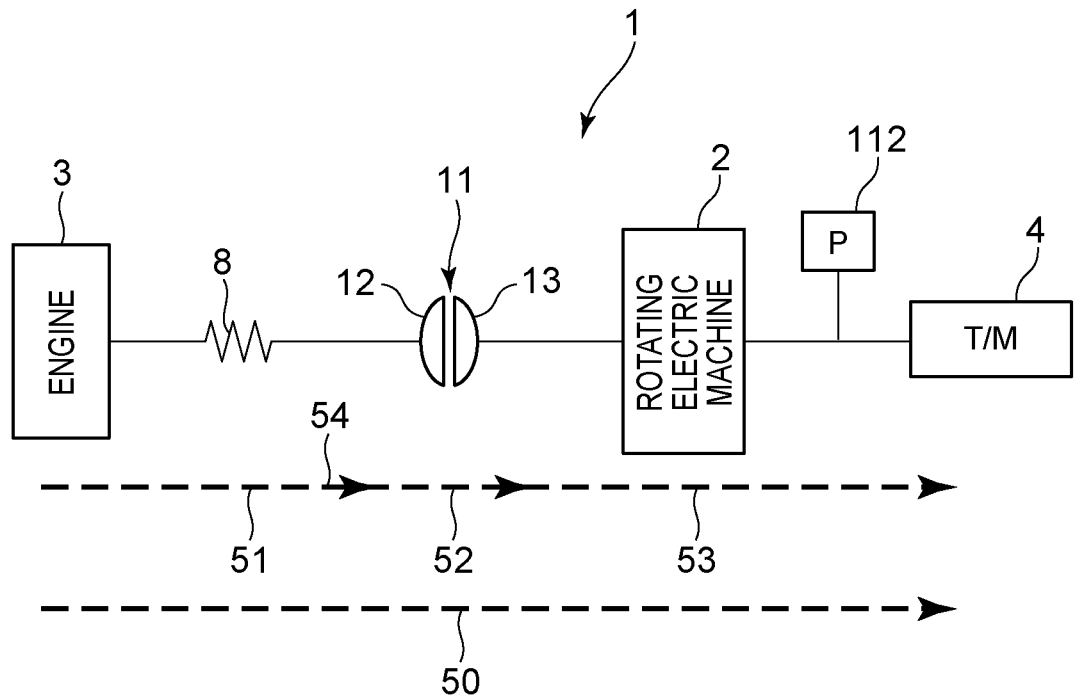
FIG. 22A is a schematic input path diagram of a vehicle drive apparatus of FIG. 3A with a pump added thereto.
Figure 22B:
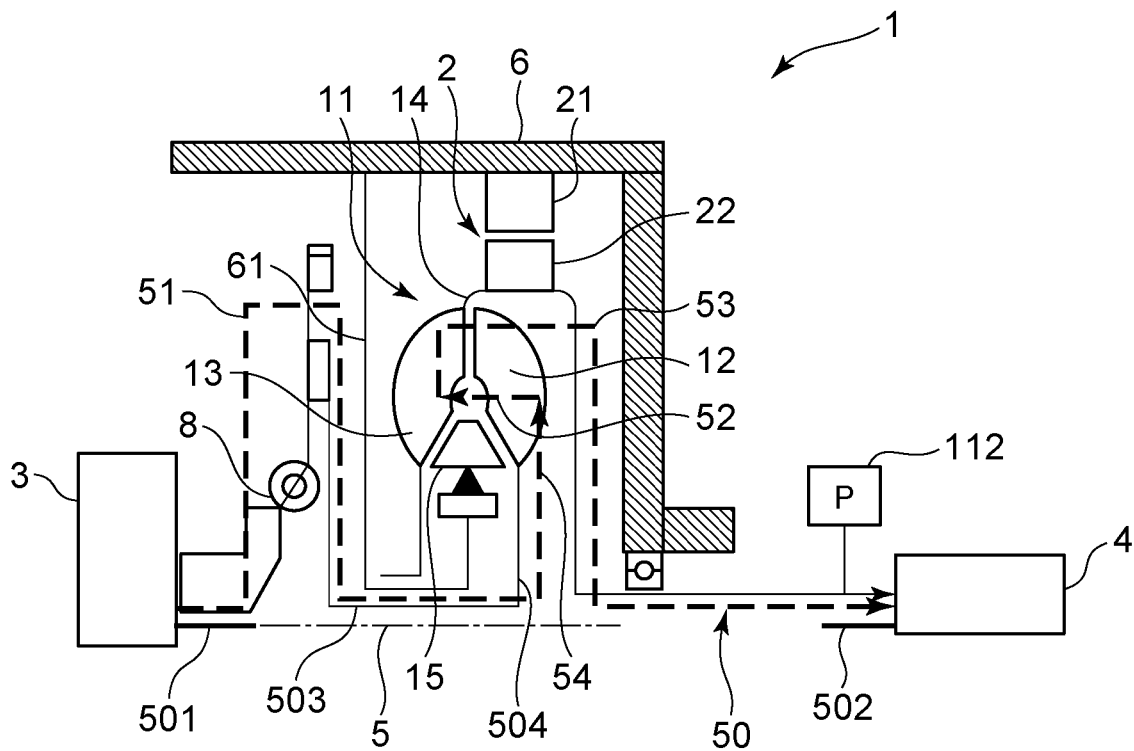
FIG. 22B is a schematic configuration diagram of the vehicle drive apparatus illustrated in FIG. 22A.
Figure 23A:
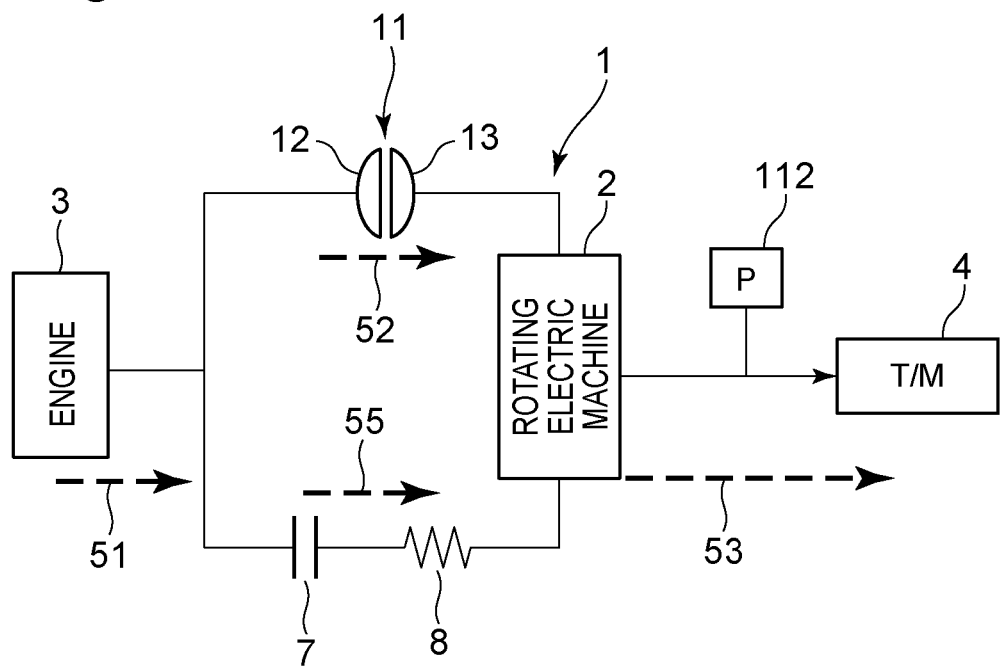
FIG. 23A is a schematic input path diagram of a vehicle drive apparatus of FIG. 5A with a pump added thereto.
Figure 23B:
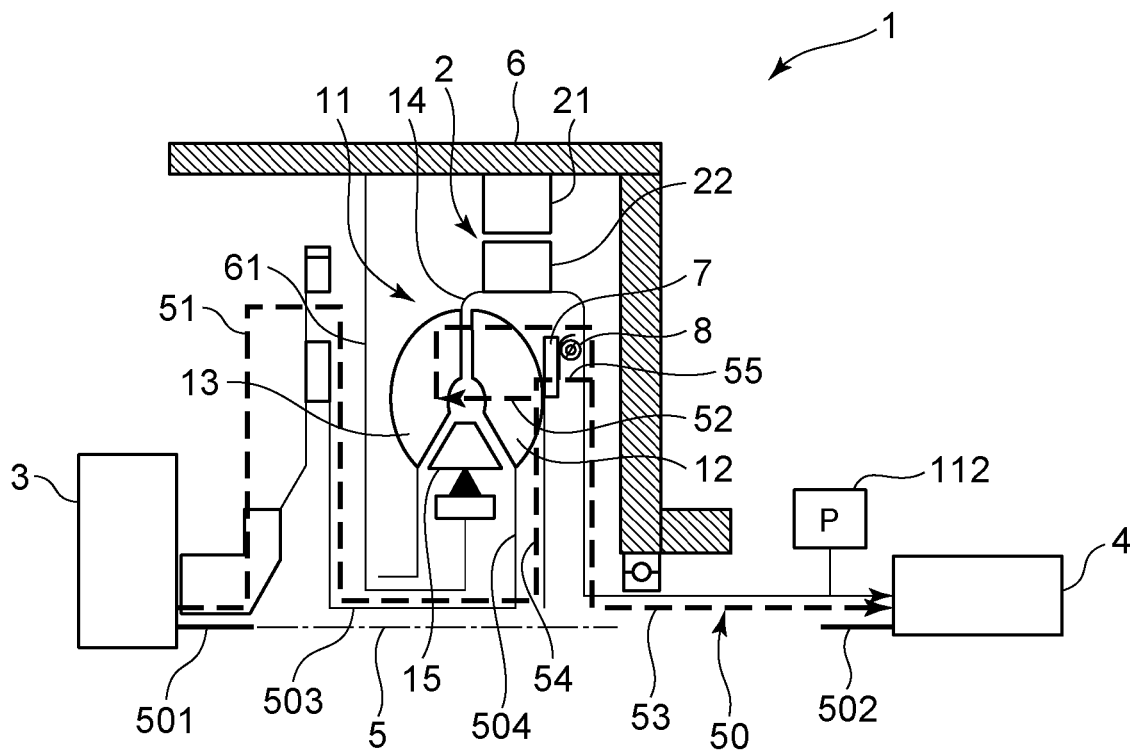
FIG. 23B is a schematic configuration diagram of the vehicle drive apparatus illustrated in FIG. 23A.
Figure 24A:
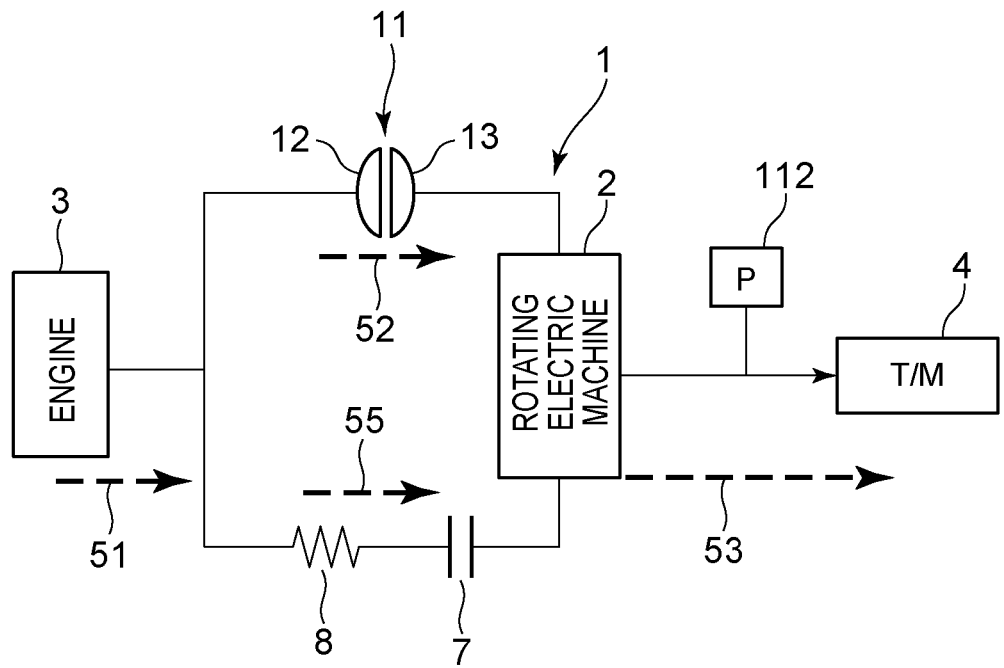
FIG. 24A is a schematic input path diagram of a vehicle drive apparatus of FIG. 6A with a pump added thereto.
Figure 24B:
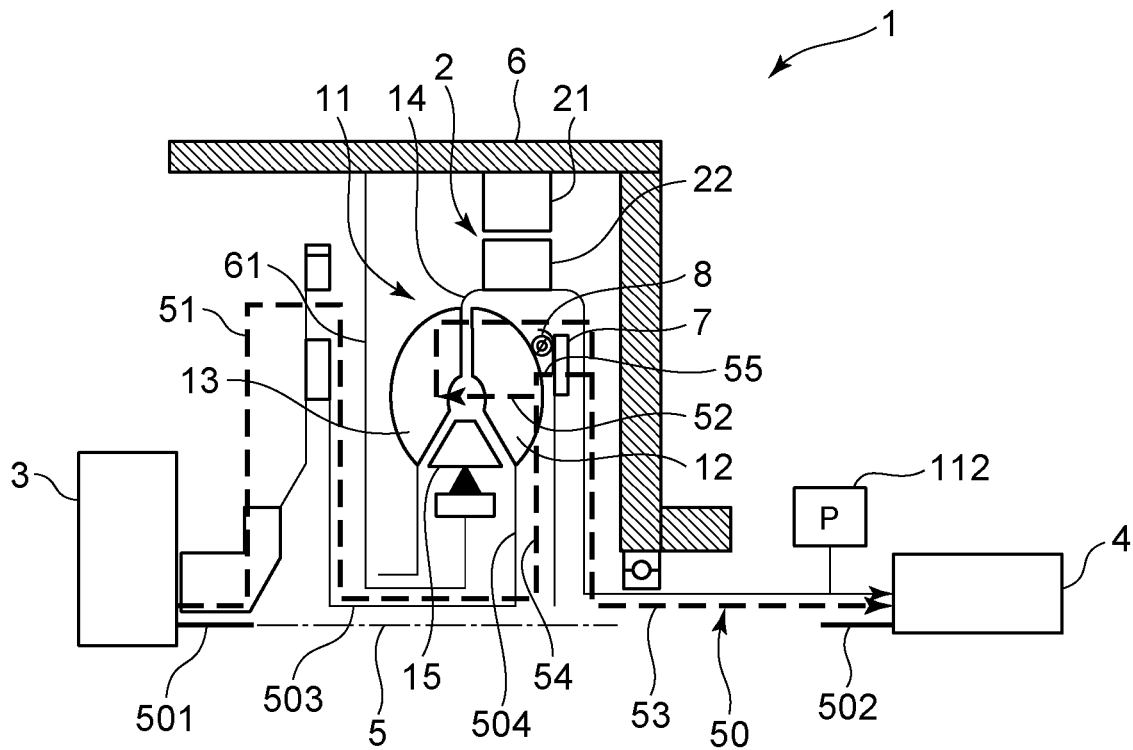
FIG. 24B is a schematic configuration diagram of the vehicle drive apparatus illustrated in FIG. 24A.
Figure 25A:
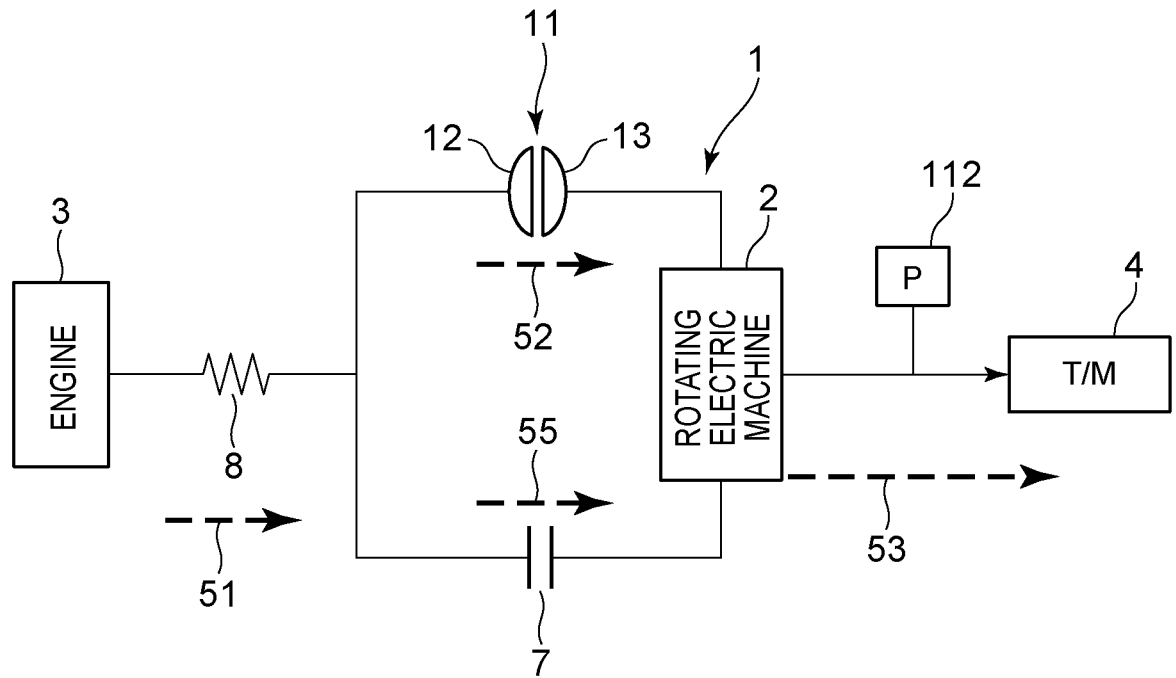
FIG. 25A is a schematic input path diagram of a vehicle drive apparatus of FIG. 7A with a pump added thereto.
Figure 25B:
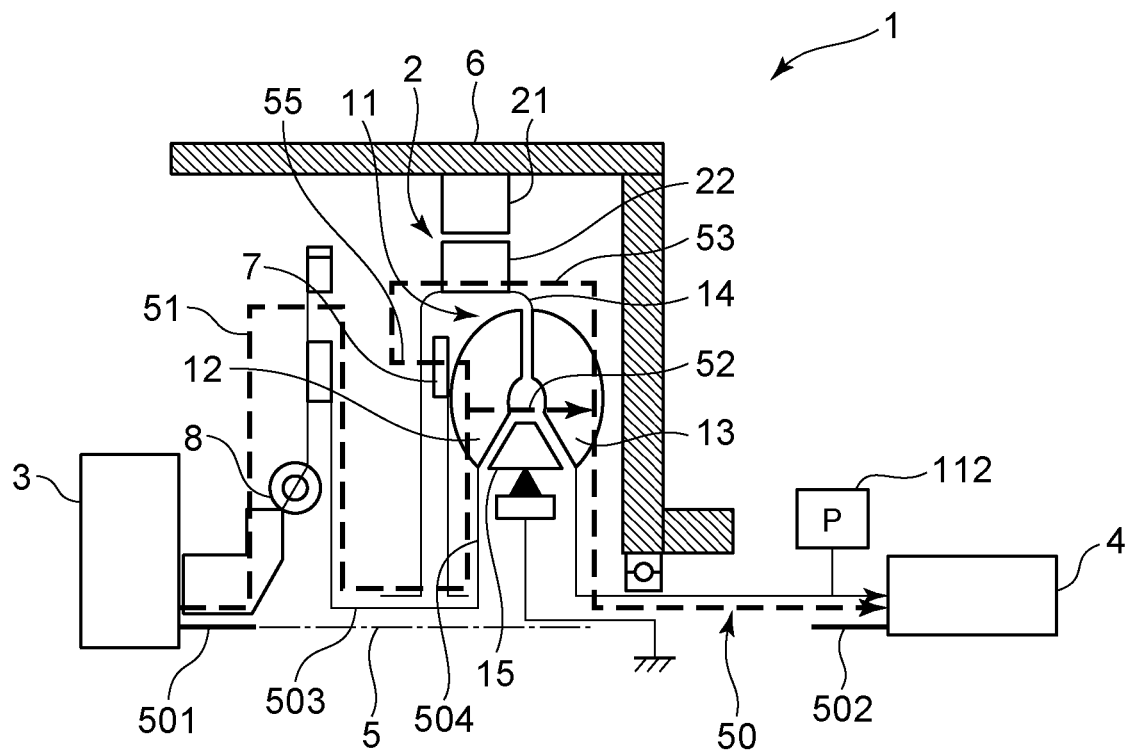
FIG. 25B is a schematic configuration diagram of the vehicle drive apparatus illustrated in FIG. 25A.
Figure 26A:
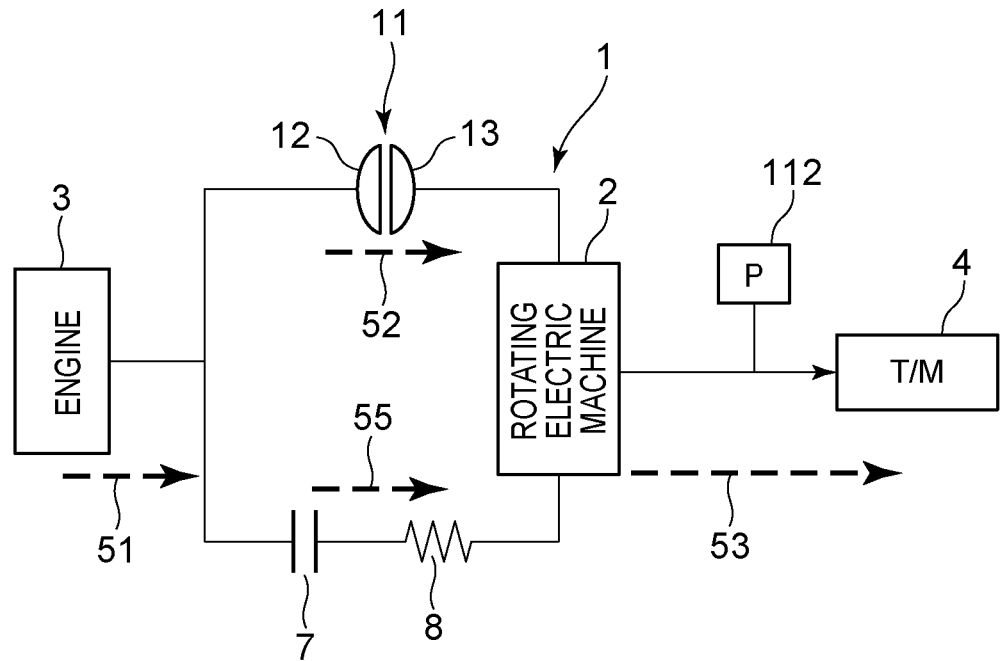
FIG. 26A is a schematic input path diagram of a vehicle drive apparatus of FIG. 8A with a pump added thereto.
Figure 26B:
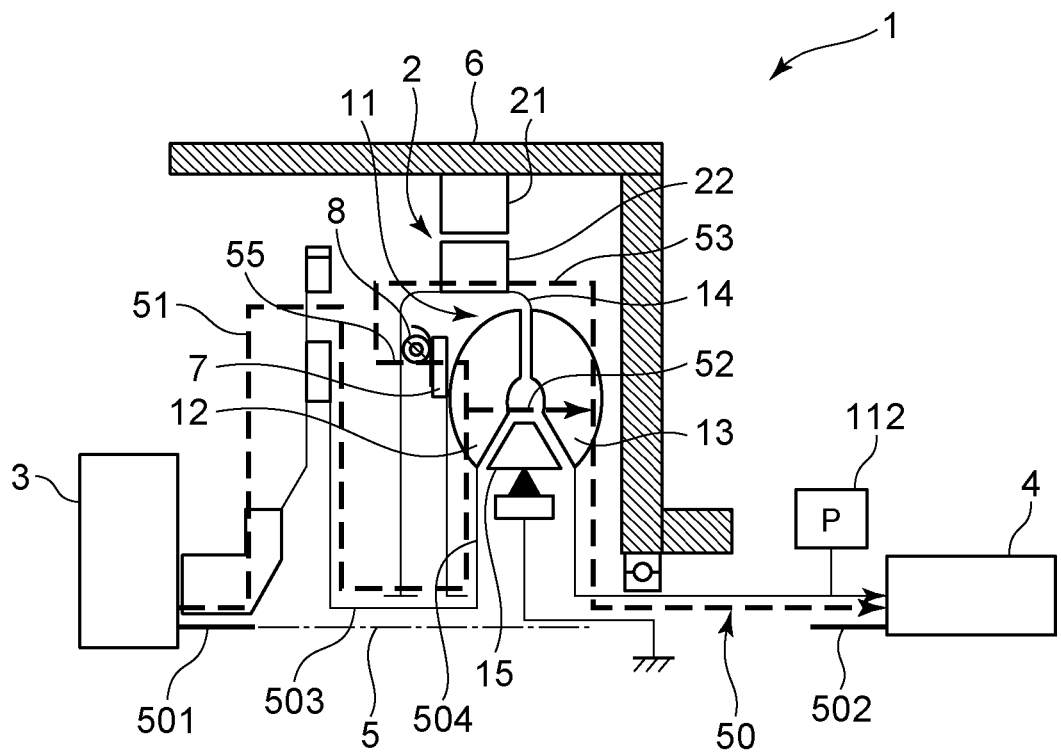
FIG. 26B is a schematic configuration diagram of the vehicle drive apparatus illustrated in FIG. 26A.
Figure 27A:
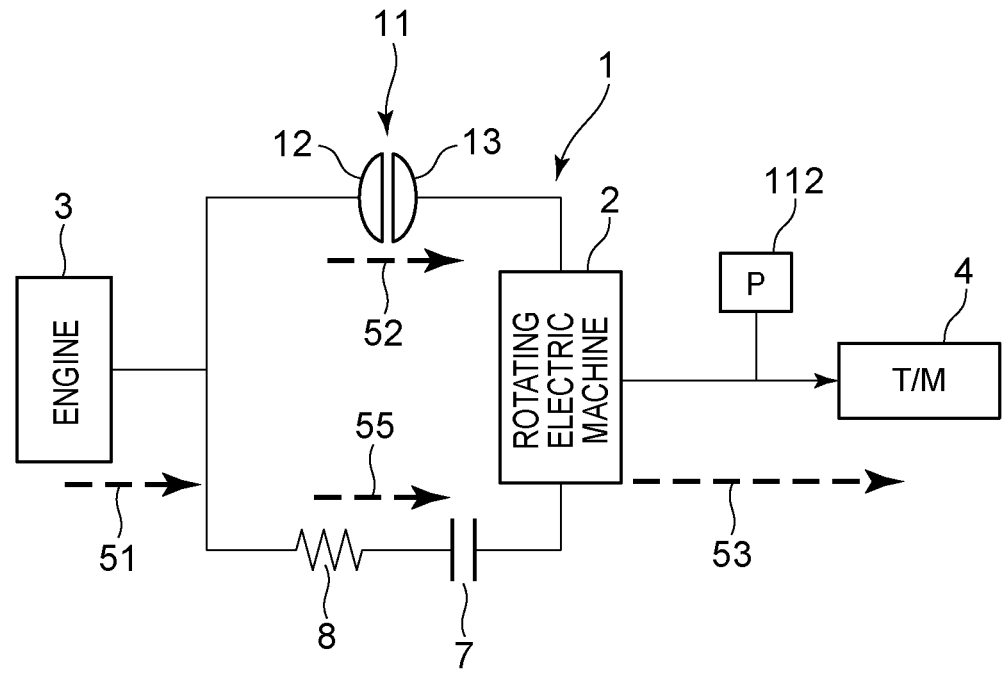
FIG. 27A is a schematic input path diagram of a vehicle drive apparatus of FIG. 9A with a pump added thereto.
Figure 27B:
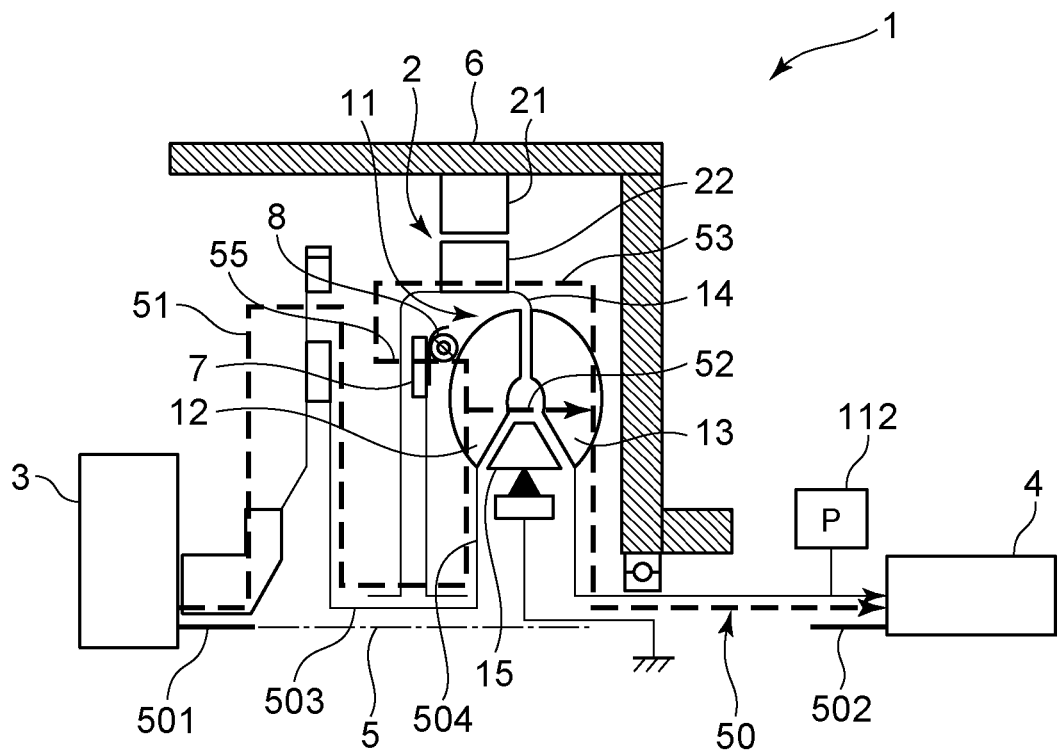
FIG. 27B is a schematic configuration diagram of the vehicle drive apparatus illustrated in FIG. 27A.

As shown in FIG. 19B, in the vehicle drive apparatus 1 of the fifth embodiment, a pump-driving input shaft of the oil pump 112 is connected to the third path 53 between the rotating electric machine 2 and the transmission 4. For example, the oil pump 112 is a mechanical pump. By driving the oil pump 112, the oil pump 112 respectively supplies specified operating pressures for respectively driving the fluid coupling 11 and the hydraulically-operated clutch element 7 thereto. The input shaft of the oil pump 112 is driven by the torque transmitted through the third path 53 between the rotating electric machine 2 and the transmission 4. The third path 53 is a torque transmission path from the turbine 13 to the input shaft 502 of the transmission 4 via the outer shell 14 and the rotor 22 of the rotating electric machine 2, and the torque having been output from the turbine 13 is transmitted to the input shaft 502 of the transmission 4 and the input shaft of the oil pump 112 via the outer shell 14 and the rotor 22 of the rotating electric machine 2.

Next, one example of a flow of engine start or restart of the vehicle drive apparatus 1 of the fifth embodiment will be explained. Firstly, the rotating electric machine 2 is driven to drive the oil pump 112. By driving the oil pump 112, the oil pump 112 can respectively supply the specified operating pressures to the fluid coupling 4 and the clutch element 7. Thereafter, the engine 3 is started or restarted to start a vehicle under specified performance of the fluid coupling 11. Furthermore, under specified performance of the clutch element 7, the impeller 12 and the outer shell 14 of the fluid coupling 11 are directly connected to each other to drive the vehicle.

In contrast, when the oil pump 112 is not driven by the rotating electric machine 2, the oil pump 112 can not supply specified operating pressures to the fluid coupling 11 and the clutch element 7. Therefore, torque output from the engine 3 can not be sufficiently transmitted to the transmission side via the fluid coupling 11 and the clutch element 7.

That is, in a case where the input shaft of the oil pump 112 is not driven by the rotating electric machine 2 before starting or restarting of the engine 3, the input shaft of the oil pump 112 is not driven until the input shaft thereof is driven by driving of the turbine 13 after starting or restarting of the engine 3. If the oil pump 112 is not driven, torque capacity capable of being transmitted by the fluid coupling 11 can be reduced, or the impeller 12 and the outer shell 14 can not be connected to each other with the clutch element 7. As a result, it may be difficult to drive the oil pump 112.

Therefore, before specified torque is input to the fluid coupling 11 and the clutch element 7, the rotating electric machine 2 is driven to rotate the rotor 22 about the rotation axis 5, resulting in driving the oil pump 112. Here, the specified torque means torque having been input from the engine 3 and necessary for driving the oil pump 112 or starting a vehicle. In such configuration, the rotating electric machine 2 is driven before the specified torque is input into the fluid coupling 11 and the clutch element 7, and then, torque having been output from the rotating electric machine 2 is transmitted to the input shaft of the oil pump 112 via the transmission path 53 to drive the oil pump 112. As a result, since the specified operating pressure is supplied from the oil pump 112 to the fluid coupling 11, torque can be smoothly transmitted from the engine 3 to the transmission 4. Furthermore, since the specified operating pressure is supplied from the oil pump 112 to the clutch element 7, torque can be smoothly transmitted from the engine 3 to the transmission 4.

The oil pump 112 of the fifth embodiment can be provided on any one of the vehicle drive apparatuses 1, regardless of any configuration on the upstream side of the oil pump 112 on the third path 53. That is, for example, even though in the configuration shown in FIGS. 20A to 27B, the input shaft of the oil pump 12 can be connected to the rotating electric machine 2 to drive the oil pump 112 by the rotating electric machine 2.

According to such configuration, since for starting or restarting of the engine 3, the rotating electric machine 2 is driven before specified torque is input into the fluid coupling 11 and the clutch element 7, and then, torque having been output from the rotating electric machine 2 is transmitted to the input shaft of the oil pump 112 via the third path 53 to drive the oil pump 112. As a result, since the specified operating pressure is supplied from the oil pump 112 to the fluid coupling 11, torque can be smoothly transmitted from the engine 3 to the transmission 4. Furthermore, since the specified operating pressure is supplied from the oil pump 112 to the clutch element 7, torque can be smoothly transmitted from the engine 3 to the transmission 4.

(Variations)

Figure 28A:
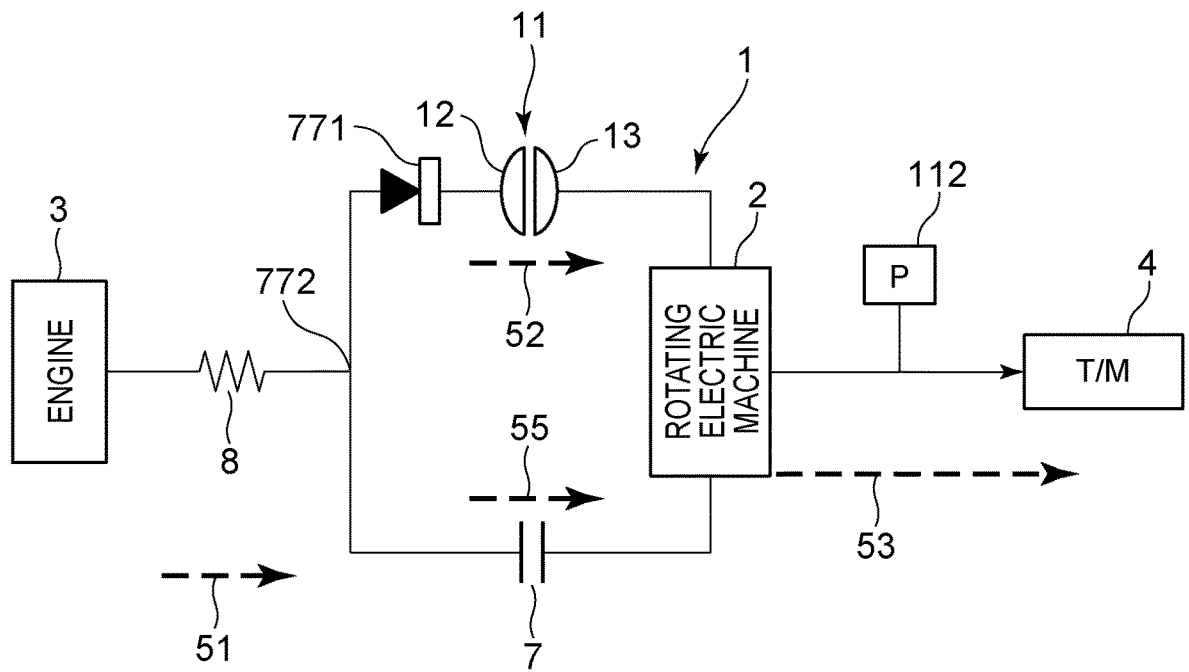
FIG. 28A is a schematic input path diagram of a vehicle drive apparatus according to a first variation of the fifth embodiment illustrated in FIG. 19A.
Figure 28B:
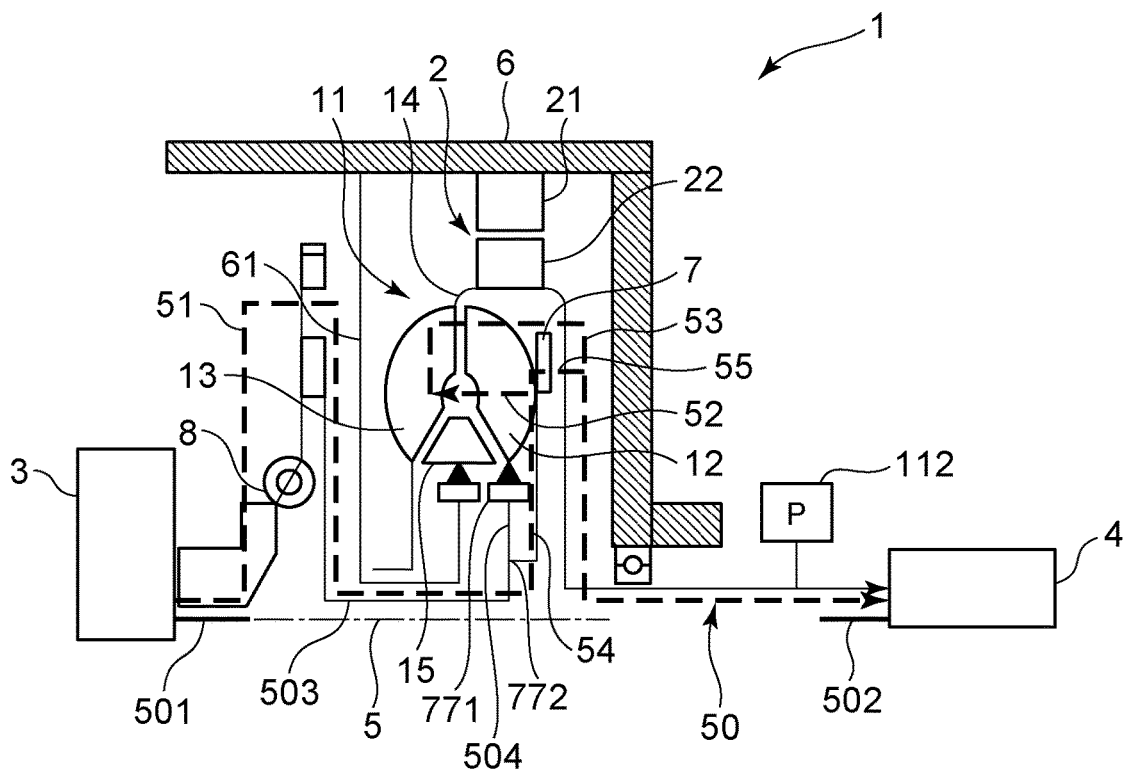
FIG. 28B is a schematic configuration diagram of the vehicle drive apparatus illustrated in FIG. 28A.

As a first variation of the fifth embodiment, the vehicle drive apparatus 1 has a one-way clutch 771 as shown in FIGS. 28A and 28B. The one-way clutch 771 is arranged at a position adjacent to the engine side of the impeller 12. In other words, the one-way clutch 771 is arranged between the radial connection member 504 and the impeller 12. The intermediate portion of the radial connection member 504 is provided with a branch point 772. In the first variation of the fifth embodiment, the branch point 772 means a location where the transmission path of torque is divided in order to transmit the torque having been output from the engine 3 to the impeller 12 or the clutch element 7. When the engine 3 is stopped, the oil pump 112 is driven by torque having been output from the rotating electric machine 2, and then, the turbine 13 connected to the rotor 22 of the rotating electric machine 2 via the outer shell 14 is driven by torque having been output from the rotating electric machine 2. At that time, the rotation speed of the turbine 13 exceeds the rotation speed of the impeller 12 connected to the stopped engine 3. Thus, any drag torque may be generated due to fluid in the fluid coupling 11. That is, when the oil pump 112 is driven, it is necessary for the rotating electric machine 2 to generate torque that is a sum of torque necessary for driving the oil pump 112 and drag torque generated at the fluid coupling 11. This first variation is applied for removing such an issue.

According to the configuration in the first variation of the fifth embodiment, the one-way clutch 771 transmits only torque to be input from the engine 3 side to the one-way clutch 71 and to be output from the one-way clutch 771 to the impeller 12 side. According to such configuration, it is possible to prevent torque from being transmitted in a direction from the impeller 12 towards the engine 3 and suppress any increase of the drag torque. As a result, it is possible to reduce torque to be necessarily generated in the rotating electric machine 2 when the oil pump 11 is driven. The one-way clutch 771 may be arranged on the radial connection member 504 between the branch point 772 and the impeller 12 without being adjacent to the engine 3 side of the impeller 12.

Figure 29A:
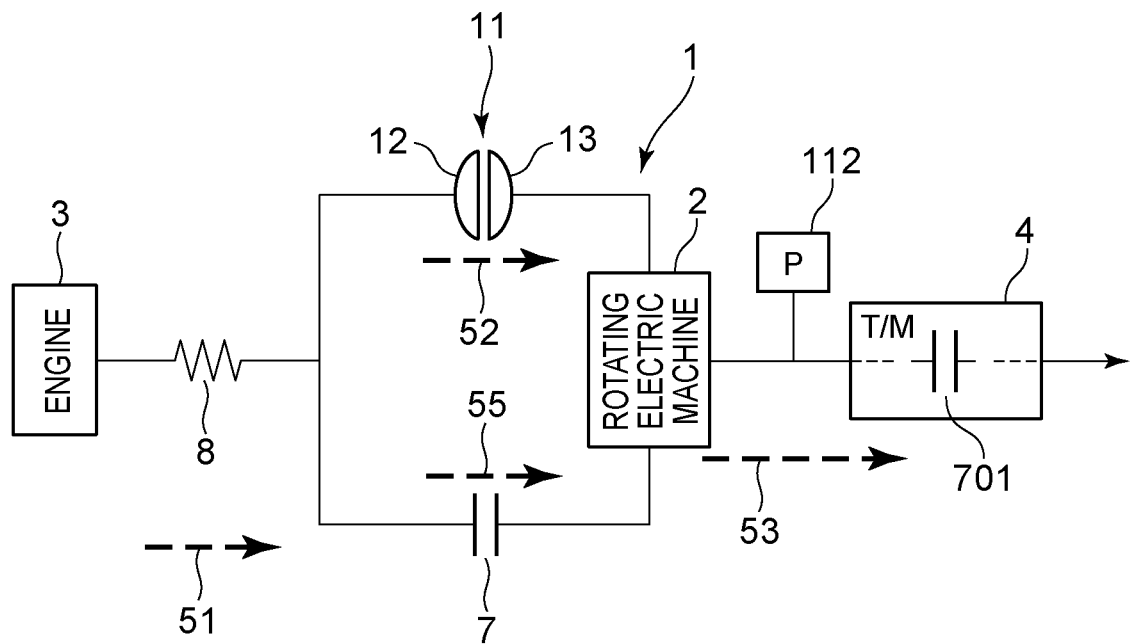
FIG. 29A is a schematic input path diagram of a vehicle drive apparatus according to a second variation of the fifth embodiment illustrated in FIG. 19A.
Figure 30A:
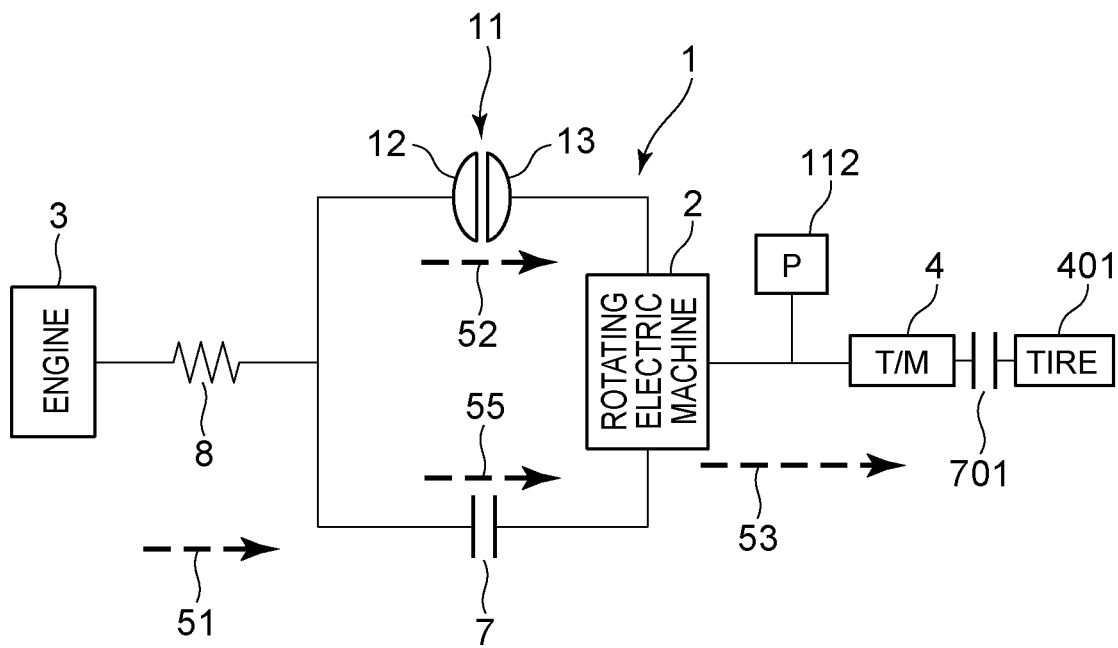
FIG. 30A is a schematic input path diagram of a vehicle drive apparatus according to a third variation of the fifth embodiment illustrated in FIG. 19A.
Figure 30B:
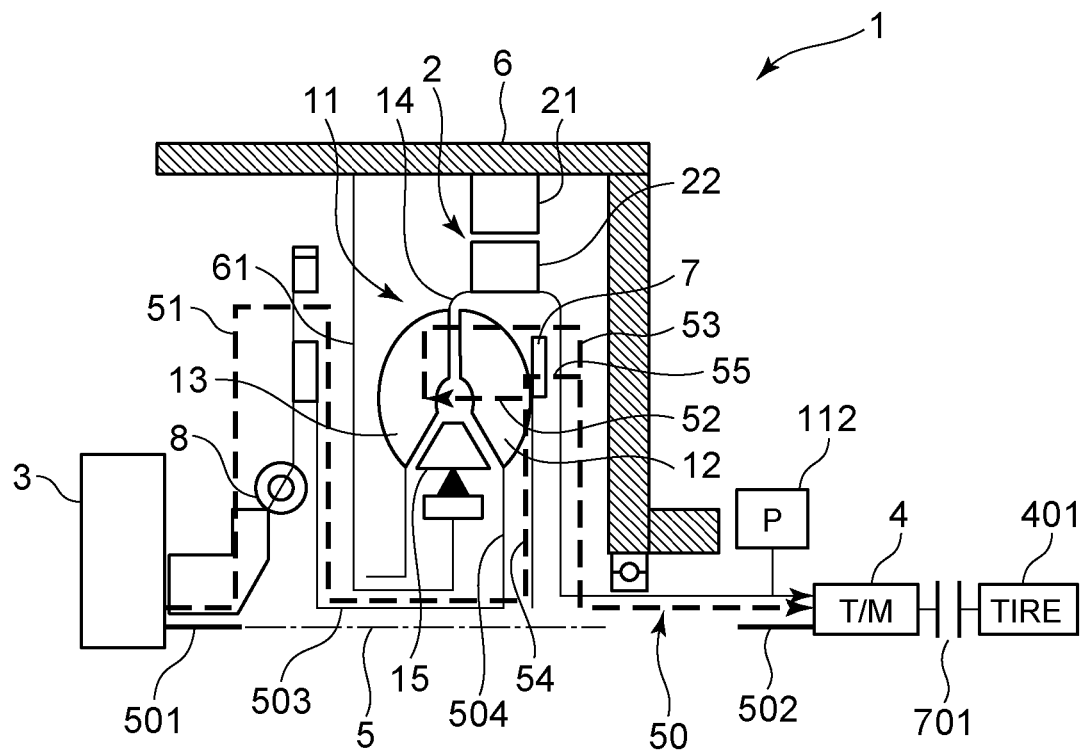
FIG. 30B is a schematic configuration diagram of the vehicle drive apparatus illustrated in FIG. 30A.

As second and third variations of the fifth embodiment, the vehicle drive apparatus 1 has a power cut-off mechanism 701 provided between the oil pump 112 and tires 401 so as to be in series on the transmission path as shown in FIGS. 29A and 30B.

Figure 29B:
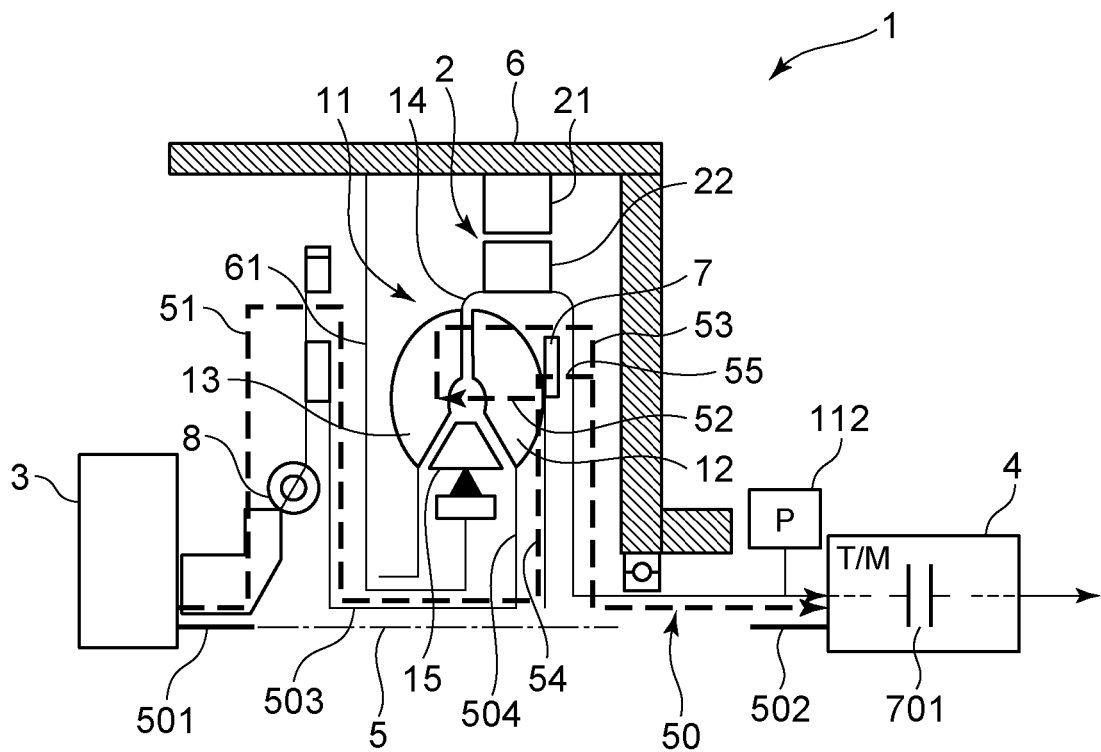
FIG. 29B is a schematic configuration diagram of the vehicle drive apparatus illustrated in FIG. 29A.

In FIGS. 29A and 29B, as the second variation of the fifth embodiment, the power cut-off mechanism 701 is arranged in the inside of the transmission 4 so as to be in series on torque transmission. For example, the power cut-off mechanism 701 is a clutch element. The power cut-off mechanism 701 is connected to the outer shell 14 of the fluid coupling 11 and the rotor 22 of the rotating electric machine 2 via a transmission member. The power cut-off mechanism 701 is connected to the output shaft of the transmission 4. That is, torque output from the fluid coupling 11 and the rotating electric machine 2 and input into the transmission 4 via the third path 53 is output from the transmission 4 via the power cut-off mechanism 701 so that the power cut-off mechanism 701 may cut off the torque.

In FIGS. 30A and 30B, as the third variation of the fifth embodiment, the power cut-off mechanism 701 is arranged between the transmission 4 and the tires 401. That is, torque output from the fluid coupling 11 and the rotating electric machine 2 is input into the tires 401 via the third path 53 and the transmission 4 and via the power cut-off mechanism 701 so that the power cut-off mechanism 701 may cut off the torque. In the second and third variations of the fifth embodiment, the power cut-off mechanism 701 is arranged on a position on the downstream side of the oil pump 112 on the transmission path and on the upstream side of the tires 401.

If the power cut-off mechanism 701 is not provided, in order to supply operating pressures to the fluid coupling 11 and the rotating electric machine 2 to prepare for drive of the engine 3, the fluid coupling 11 and the rotor 22 of the rotating electric machine 2 are rotated for driving the oil pump 112 to transmit torque output from the rotating electric machine 2 to the tires 401. Thus, the vehicle might unintentionally start. The variations are applied for removing such an issue.

According to the configuration in the second and third variations of the fifth embodiment, the transmission of the torque having been output from the rotating electric machine 2 can be cut off by the power cut-off mechanism 701. A state where the torque transmission is cut off by the power cut-off mechanism 701 is similar to a state where the transmission mode of the vehicle in the transmission 4 is changed into a neutral mode. That is, the torque having been output from the rotating electric machine 2 is not transmitted to the tires 401. As a result, even though the rotor 22 of the rotating electric machine 2 rotates for driving the oil pump 112, torque is not transmitted to the tires 401, and thus, it is possible to prevent the vehicle from unintentionally starting.

It is to be noted that any embodiment or variation among the various embodiments or variations described above are appropriately combined, whereby it is possible to achieve the respective effects of the various embodiments or variations. Furthermore, combinations of embodiments, combinations of examples, or combinations of embodiments and examples are possible, and combinations of features among different embodiments or examples are also possible.

The vehicle drive apparatus according to the above aspect of the present invention can be applied to a hybrid electric vehicle (HEV) as an example.

What is claimed is:

1. A vehicle drive apparatus, comprising:
a fluid coupling connected to an engine; and
a rotating electric machine connected to the engine via the fluid coupling, wherein
the fluid coupling has
an impeller to which torque having been output from the engine is input, the impeller rotating about a rotation axis of an output shaft of the engine, and
a turbine facing the impeller, the turbine to which torque having been output from the impeller is input via a fluid, the turbine rotating about the rotation axis, and
the vehicle drive apparatus has
a path provided between the output shaft of the engine and the impeller, the path through which torque having been output from the engine is transmitted to the impeller not via the turbine, and
a path through which torque having been input to the impeller is output via the rotating electric machine, passing through a radially outside relative to the impeller with respect to the rotation axis from the impeller via the turbine.

2. The vehicle drive apparatus according to claim 1, wherein
the fluid coupling further has
an outer shell connected to the turbine, the outer shell to which torque to be output from the turbine is input, and
a stator connected to a fixing member and arranged between the impeller and the turbine, and
the rotating electric machine has
a rotor connected to the outer shell, and
a stator fixed to a fixed portion.

3. The vehicle drive apparatus according to claim 2, further comprising
a clutch element arranged between the engine and the rotating electric machine, wherein
the clutch element slides along the rotation axis in a direction from the impeller towards the turbine, and then, the clutch element and the outer shell are frictionally engaged with each other, thus allowing the clutch element and the outer shell to be fastened with each other.

4. The vehicle drive apparatus according to claim 3, wherein the clutch element and the impeller are integrally provided.

5. The vehicle drive apparatus according to claim 2, wherein
the fluid coupling is arranged between the engine and a transmission,
the rotating electric machine is arranged between the fluid coupling and the transmission, and
torque having been output from the engine is input to the transmission via the outer shell of the fluid coupling and the rotating electric machine.

6. The vehicle drive apparatus according to claim 3, wherein
the fluid coupling is arranged between the engine and a transmission,
the rotating electric machine is arranged between the fluid coupling and the transmission, and
torque having been output from the engine is input to the transmission via the outer shell of the fluid coupling and the rotating electric machine.

7. The vehicle drive apparatus according to claim 4, wherein
the fluid coupling is arranged between the engine and a transmission,
the rotating electric machine is arranged between the fluid coupling and the transmission, and
torque having been output from the engine is input to the transmission via the outer shell of the fluid coupling and the rotating electric machine.

8. The vehicle drive apparatus according to claim 2, wherein torque having been output from the outer shell and the rotating electric machine is transmitted, via an input shaft of a transmission connected to the outer shell and the rotating electric machine, to a shaft arranged separately from the input shaft and having a rotation axis parallel to each other with a rotation axis of the input shaft.

9. The vehicle drive apparatus according to claim 3, wherein torque having been output from the outer shell and the rotating electric machine is transmitted, via an input shaft of a transmission connected to the outer shell and the rotating electric machine, to a shaft arranged separately from the input shaft and having a rotation axis parallel to each other with a rotation axis of the input shaft.

10. The vehicle drive apparatus according to claim 4, wherein torque having been output from the outer shell and the rotating electric machine is transmitted, via an input shaft of a transmission connected to the outer shell and the rotating electric machine, to a shaft arranged separately from the input shaft and having a rotation axis parallel to each other with a rotation axis of the input shaft.

11. The vehicle drive apparatus according to claim 5, wherein torque having been output from the outer shell and the rotating electric machine is transmitted, via an input shaft of the transmission connected to the outer shell and the rotating electric machine, to a shaft arranged separately from the input shaft and having a rotation axis parallel to each other with a rotation axis of the input shaft.

12. The vehicle drive apparatus according to claim 2, further comprising
a first bearing and a second bearing provided at both axial end portions of the rotation axis of the fluid coupling, respectively, and rotatably supporting the fluid coupling, wherein
the first bearing is supported by an input member of a damper mechanism between the engine and the impeller, and
the second bearing is supported by the fixed portion.

13. The vehicle drive apparatus according to claim 3, further comprising
a first bearing and a second bearing provided at both axial end portions of the rotation axis of the fluid coupling, respectively, and rotatably supporting the fluid coupling, wherein
the first bearing is supported by an input member of a damper mechanism between the engine and the impeller, and
the second bearing is supported by the fixed portion.

14. The vehicle drive apparatus according to claim 4, further comprising
a first bearing and a second bearing provided at both axial end portions of the rotation axis of the fluid coupling, respectively, and rotatably supporting the fluid coupling, wherein
the first bearing is supported by an input member of a damper mechanism between the engine and the impeller, and
the second bearing is supported by the fixed portion.

15. The vehicle drive apparatus according to claim 5, further comprising
a first bearing and a second bearing provided at both axial end portions of the rotation axis of the fluid coupling, respectively, and rotatably supporting the fluid coupling, wherein
the first bearing is supported by an input member of a damper mechanism between the engine and the impeller, and
the second bearing is supported by the fixed portion.

16. The vehicle drive apparatus according to claim 1, further comprising
a one-way clutch arranged between the engine and the impeller, wherein
the one-way clutch transmits only torque to be input from an engine side of the one-way clutch and to be output to an impeller side of the one-way clutch.

17. The vehicle drive apparatus according to claim 2, further comprising
a one-way clutch arranged between the engine and the impeller, wherein
the one-way clutch transmits only torque to be input from an engine side of the one-way clutch and to be output to an impeller side of the one-way clutch.

18. The vehicle drive apparatus according to claim 3, further comprising
a one-way clutch arranged between the engine and the impeller, wherein
the one-way clutch transmits only torque to be input from an engine side of the one-way clutch and to be output to an impeller side of the one-way clutch.

19. The vehicle drive apparatus according to claim 4, further comprising
a one-way clutch arranged between the engine and the impeller, wherein
the one-way clutch transmits only torque to be input from an engine side of the one-way clutch and to be output to an impeller side of the one-way clutch.

20. The vehicle drive apparatus according to claim 5, further comprising a pump which pump-driving input shaft is connected to a transmission path between the rotating electric machine and the transmission.

* * * * *